United States Patent
Assouline et al.

(10) Patent No.: US 12,327,277 B2
(45) Date of Patent: Jun. 10, 2025

(54) HOME BASED AUGMENTED REALITY SHOPPING

(71) Applicant: Snap Inc., Santa Monica, CA (US)

(72) Inventors: Avihay Assouline, Tel Aviv (IL); Itamar Berger, Hod Hasharon (IL); Nir Malbin, Shoham (IL); Ma'ayan Shuvi, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 791 days.

(21) Appl. No.: 17/301,692

(22) Filed: Apr. 12, 2021

(65) Prior Publication Data

US 2022/0327608 A1 Oct. 13, 2022

(51) Int. Cl.
*G06Q 30/0601* (2023.01)
*G06F 18/21* (2023.01)
(Continued)

(52) U.S. Cl.
CPC ....... *G06Q 30/0643* (2013.01); *G06F 18/214* (2023.01); *G06F 18/217* (2023.01);
(Continued)

(58) Field of Classification Search
CPC ............... G06F 18/214; G06F 18/217; G06Q 30/06–0645; G06Q 30/08; G06Q 50/01; G06T 19/006; G06T 2210/04; G06V 10/74; G06V 10/751; G06V 10/764; G06V 10/82; G06V 20/20; G06V 20/41; G06V 40/161; G16Y 10/00–90
See application file for complete search history.

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 104156700 | 11/2014 |
| CN | 103390287 | 8/2018 |

(Continued)

OTHER PUBLICATIONS

"U.S. Appl. No. 17/648,363, Corrected Notice of Allowability mailed Jan. 19, 2024", 2 pgs.

(Continued)

*Primary Examiner* — Adam L Levine
(74) *Attorney, Agent, or Firm* — Schwegman Lundberg & Woessner, P.A.

(57) ABSTRACT

Aspects of the present disclosure involve a system comprising a computer-readable storage medium storing a program and a method for performing operations comprising: receiving a video that includes a depiction of one or more objects in a room within a home; determining a room classification for the room by processing the one or more objects depicted in the video; selecting one or more augmented reality items available for purchase based on the room classification and the one or more objects depicted in the video; and generating, for display within the video, the one or more augmented reality items that have been selected at a display position within the video corresponding to the one or more objects depicted in the video.

20 Claims, 12 Drawing Sheets

(51) Int. Cl.
*G06F 18/214* (2023.01)
*G06T 19/00* (2011.01)
*G06V 10/75* (2022.01)
*G06V 20/40* (2022.01)

(52) U.S. Cl.
CPC .......... *G06T 19/006* (2013.01); *G06V 10/751* (2022.01); *G06V 20/41* (2022.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,113,917 B2 | 9/2006 | Jacobi et al. |
| 7,342,587 B2 | 3/2008 | Danzig et al. |
| 7,391,900 B2 | 6/2008 | Kim et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,159,166 B2 | 10/2015 | Finn et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,002,337 B2 * | 6/2018 | Siddique ................ G06Q 30/06 |
| 10,026,209 B1 | 7/2018 | Dagley et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,250,948 B1 | 4/2019 | Bortz et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,482,674 B1 * | 11/2019 | Wu ....................... G09B 25/00 |
| 10,504,266 B2 | 12/2019 | Blattner et al. |
| 10,573,048 B2 | 2/2020 | Ni et al. |
| 10,657,701 B2 | 5/2020 | Osman et al. |
| 10,740,974 B1 | 8/2020 | Cowburn et al. |
| 10,956,967 B2 * | 3/2021 | Ayush ................ G06Q 30/0631 |
| 11,024,092 B2 | 6/2021 | Harviainen |
| 11,057,667 B2 | 7/2021 | Rabbat et al. |
| 11,210,863 B1 | 12/2021 | Yan et al. |
| 11,887,260 B2 | 1/2024 | Assouline et al. |
| 11,928,783 B2 | 3/2024 | Assouline et al. |
| 11,954,762 B2 | 4/2024 | Ivanov et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0162942 A1 | 7/2007 | Hamynen et al. |
| 2007/0168863 A1 | 7/2007 | Blattner et al. |
| 2007/0176921 A1 | 8/2007 | Iwasaki et al. |
| 2008/0071559 A1 * | 3/2008 | Arrasvuori ............... G06F 3/011 |
| | | 705/26.1 |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0045869 A1 | 2/2010 | Baseley et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |

(56) References Cited

U.S. PATENT DOCUMENTS

| | | |
|---|---|---|
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0056717 A1 | 3/2012 | Maharbiz et al. |
| 2012/0068913 A1 | 3/2012 | Bar-Zeev et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0168056 A1 | 6/2014 | Swaminathan et al. |
| 2014/0285522 A1 | 9/2014 | Kim et al. |
| 2014/0298382 A1 | 10/2014 | Jo et al. |
| 2014/0298383 A1 | 10/2014 | Jo et al. |
| 2014/0317659 A1 | 10/2014 | Yasutake |
| 2014/0362084 A1 | 12/2014 | Ooi et al. |
| 2015/0009130 A1 | 1/2015 | Motta et al. |
| 2015/0193982 A1 | 7/2015 | Mihelich et al. |
| 2015/0206349 A1 | 7/2015 | Rosenthal et al. |
| 2015/0310667 A1 | 10/2015 | Young et al. |
| 2015/0317829 A1 | 11/2015 | Carter et al. |
| 2015/0331970 A1 | 11/2015 | Jovanovic |
| 2016/0134840 A1 | 5/2016 | Mcculloch |
| 2016/0210784 A1 | 7/2016 | Ramsby et al. |
| 2016/0234149 A1 | 8/2016 | Tsuda et al. |
| 2016/0343171 A1 | 11/2016 | Waldman et al. |
| 2016/0379405 A1 | 12/2016 | Baca et al. |
| 2017/0069141 A1 | 3/2017 | Carter et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0299394 A1 | 10/2017 | Lee |
| 2017/0310934 A1 | 10/2017 | Du et al. |
| 2017/0312634 A1 | 11/2017 | Ledoux et al. |
| 2018/0005448 A1 | 1/2018 | Choukroun et al. |
| 2018/0045963 A1 | 2/2018 | Hoover et al. |
| 2018/0047200 A1 | 2/2018 | O'hara et al. |
| 2018/0082480 A1 | 3/2018 | White et al. |
| 2018/0113587 A1 | 4/2018 | Allen et al. |
| 2018/0115503 A1 | 4/2018 | Baldwin et al. |
| 2018/0268220 A1 | 9/2018 | Lee et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0315248 A1 | 11/2018 | Bastov et al. |
| 2019/0001223 A1 | 1/2019 | Blackstock et al. |
| 2019/0057616 A1 | 2/2019 | Cohen et al. |
| 2019/0094981 A1 | 3/2019 | Bradski et al. |
| 2019/0096046 A1 | 3/2019 | Kalantari et al. |
| 2019/0108683 A1 | 4/2019 | Valli et al. |
| 2019/0108686 A1 | 4/2019 | Spivack et al. |
| 2019/0158910 A1 | 5/2019 | Rabbat et al. |
| 2019/0188920 A1 | 6/2019 | Mcphee et al. |
| 2019/0205646 A1 | 7/2019 | Piramuthu et al. |
| 2019/0251401 A1 | 8/2019 | Shechtman et al. |
| 2019/0310757 A1 | 10/2019 | Lee et al. |
| 2019/0378204 A1 | 12/2019 | Ayush et al. |
| 2020/0175311 A1 | 6/2020 | Xu et al. |
| 2020/0211288 A1 | 7/2020 | Woods et al. |
| 2020/0242813 A1 | 7/2020 | Nishikawa et al. |
| 2020/0302681 A1 | 9/2020 | Totty et al. |
| 2020/0394843 A1 | 12/2020 | Ramachandra Iyer |
| 2020/0413011 A1 | 12/2020 | Zass et al. |
| 2021/0027083 A1 | 1/2021 | Cohen et al. |
| 2021/0027471 A1 | 1/2021 | Cohen et al. |
| 2021/0042988 A1 | 2/2021 | Molyneaux et al. |
| 2021/0183128 A1 | 6/2021 | Miller |
| 2021/0286504 A1 | 9/2021 | Moore |
| 2021/0295599 A1 | 9/2021 | Adkinson et al. |
| 2021/0383116 A1 | 12/2021 | Mavrantonakis et al. |
| 2021/0383912 A1 | 12/2021 | Jackson et al. |
| 2022/0006973 A1 | 1/2022 | Kies et al. |
| 2022/0058553 A1 | 2/2022 | Stewart et al. |
| 2022/0068037 A1 | 3/2022 | Pardeshi |
| 2022/0101638 A1 | 3/2022 | Bae et al. |
| 2022/0156426 A1 | 5/2022 | Hampali et al. |
| 2022/0222724 A1 | 7/2022 | Graham |
| 2022/0366189 A1 | 11/2022 | Oreifej et al. |
| 2022/0413434 A1 | 12/2022 | Parra Pozo et al. |
| 2023/0022194 A1 | 1/2023 | Soryal |
| 2023/0063209 A1 | 3/2023 | Oreifej |
| 2023/0214900 A1* | 7/2023 | Assouline ............ G06T 17/205 |
| | | 705/26.7 |
| 2023/0215104 A1 | 7/2023 | Assouline et al. |
| 2023/0215105 A1 | 7/2023 | Assouline et al. |
| 2023/0230292 A1 | 7/2023 | Ivanov et al. |
| 2023/0230328 A1 | 7/2023 | Assouline et al. |
| 2024/0177430 A1 | 5/2024 | Assouline et al. |

FOREIGN PATENT DOCUMENTS

| | | | |
|---|---|---|---|
| CN | 109863532 | 6/2019 | |
| CN | 110168478 | 8/2019 | |
| CN | 106778453 | 5/2020 | |
| CN | 113689324 A | 11/2021 | |
| CN | 118451474 A | 8/2024 | |
| CN | 118489124 A | 8/2024 | |
| CN | 118489125 A | 8/2024 | |
| CN | 118489138 A | 8/2024 | |
| CN | 118591825 A | 9/2024 | |
| EP | 2184092 | 5/2010 | |
| EP | 2983138 A1 | 2/2016 | |
| EP | 3155560 | 5/2020 | |
| EP | 3862849 A1 * | 8/2021 | ............ G06F 3/011 |
| JP | 2001230801 | 8/2001 | |
| JP | 5497931 | 3/2014 | |
| KR | 101445263 | 9/2014 | |
| KR | 20240131413 A * | 8/2024 | |
| TW | 201503002 A * | 1/2015 | |
| WO | 2003094072 | 11/2003 | |
| WO | 2004095308 | 11/2004 | |
| WO | 2006107182 | 10/2006 | |
| WO | 2007089020 | 8/2007 | |
| WO | 2007134402 | 11/2007 | |
| WO | 2012139276 | 10/2012 | |
| WO | 2013027893 | 2/2013 | |
| WO | 2013152454 | 10/2013 | |
| WO | 2013166588 | 11/2013 | |
| WO | 2014031899 | 2/2014 | |
| WO | 2014194439 | 12/2014 | |
| WO | 2016090605 | 6/2016 | |
| WO | WO-2017132689 A1 | 8/2017 | |
| WO | 2018081013 | 5/2018 | |
| WO | 2018102562 | 6/2018 | |
| WO | 2018129531 | 7/2018 | |
| WO | 2019089613 | 5/2019 | |
| WO | WO-2020075098 A1 * | 4/2020 | ........... A63F 13/213 |
| WO | WO-2023129372 A2 | 7/2023 | |
| WO | WO-2023129373 A1 | 7/2023 | |
| WO | WO-2023129441 A1 | 7/2023 | |
| WO | WO-2023129442 A2 | 7/2023 | |
| WO | WO-2023141146 A1 | 7/2023 | |
| WO | WO-2023129372 A3 | 8/2023 | |
| WO | WO-2023129442 A3 | 8/2023 | |
| WO | 2023129373 | 7/2024 | |

OTHER PUBLICATIONS

"U.S. Appl. No. 17/648,363, Corrected Notice of Allowability mailed Feb. 28, 2024", 2 pgs.

"U.S. Appl. No. 17/566,046, Non Final Office Action mailed Jul. 20, 2023", 13 pgs.

"U.S. Appl. No. 17/566,046, Notice of Allowance mailed Nov. 9, 2023", 7 pgs.

(56) References Cited

OTHER PUBLICATIONS

"U.S. Appl. No. 17/566,046, Response filed Oct. 16, 2023 to Non Final Office Action mailed Jul. 20, 2023", 10 pgs.
"U.S. Appl. No. 17/566,070, Corrected Notice of Allowability mailed Aug. 3, 2023", 4 pgs.
"U.S. Appl. No. 17/566,070, Non Final Office Action mailed Feb. 16, 2023", 14 pgs.
"U.S. Appl. No. 17/566,070, Non Final Office Action mailed May 3, 2023", 12 pgs.
"U.S. Appl. No. 17/566,070, Notice of Allowance mailed Jul. 12, 2023", 7 pgs.
"U.S. Appl. No. 17/566,070, Notice of Allowance mailed Sep. 20, 2023", 8 pgs.
"U.S. Appl. No. 17/566,070, Response filed Jun. 26, 2023 to Non Final Office Action mailed May 3, 2023", 11 pgs.
"U.S. Appl. No. 17/648,363, Non Final Office Action mailed Aug. 7, 2023", 12 pgs.
"U.S. Appl. No. 17/648,363, Notice of Allowance mailed Oct. 4, 2023", 9 pgs.
"U.S. Appl. No. 17/648,363, Response filed Sep. 19, 2023 to Non Final Office Action mailed Aug. 7, 2023", 11 pgs.
"International Application Serial No. PCT/US2022/052696, International Search Report mailed Aug. 3, 2023", 5 pgs.
"International Application Serial No. PCT/US2022/052696, Invitation to Pay Additional Fees mailed Jun. 13, 2023", 5 pgs.
"International Application Serial No. PCT/US2022/052696, Written Opinion mailed Aug. 3, 2023", 10 pgs.
"International Application Serial No. PCT/US2022/052700, International Search Report mailed May 24, 2023", 5 pgs.
"International Application Serial No. PCT/US2022/052700, Invitation to Pay Additional Fees mailed Mar. 31, 2023", 11 pgs.
"International Application Serial No. PCT/US2022/052700, Written Opinion mailed May 24, 2023", 11 pgs.
"International Application Serial No. PCT/US2022/053618, International Search Report mailed May 10, 2023", 5 pgs.
"International Application Serial No. PCT/US2022/053618, Invitation to Pay Additional Fees mailed Mar. 22, 2023", 9 pgs.
"International Application Serial No. PCT/US2022/053618, Written Opinion mailed May 10, 2023", 8 pgs.
"International Application Serial No. PCT/US2022/053622, International Search Report mailed Jun. 23, 2023", 5 pgs.
"International Application Serial No. PCT/US2022/053622, Invitation to Pay Additional Fees mailed Apr. 28, 2023", 7 pgs.
"International Application Serial No. PCT/US2022/053622, Written Opinion mailed Jun. 23, 2023", 10 pgs.
"International Application Serial No. PCT/US2023/011032, International Search Report mailed May 23, 2023", 7 pgs.
"International Application Serial No. PCT/US2023/011032, Invitation to Pay Additional Fees mailed Mar. 28, 2023", 12 pgs.
"International Application Serial No. PCT/US2023/011032, Written Opinion mailed May 23, 2023", 10 pgs.
Breen, D. E, et al., "Interactive occlusion and automatic object placement for augmented reality", Computer Graphics Forum: Journal of the European Association for Computer Graphics, Wiley-Blackwell, Oxford, vol. 15, No. 3, XP002515919, (Aug. 26, 1996), 11-22.
Liang, Mao, et al., "Deep Convolution Neural Networks for Automatic Eyeglasses Removal", 2nd International Conference on Artificial Intelligence and Engineering Applications, (Sep. 23, 2017), 8 pgs.
Roman, Suvorov, et al., "Resolution-robust Large Mask Inpainting with Fourier Convolutions", Arxiv.Org, Cornell University Library, 201 Olin Library Cornell University Ithaca, NY, (Sep. 15, 2021), 1-16.
Runfeldt, Melissa, "iSee: Using deep learning to remove eyeglasses from faces", [Online] Retrieved from the internet: <https://web.archive.org/web/20170515091918/https://blog.insightdatascience.com/isee-removing-eyeglasses-from-faces-using-deep-learning-d4e7d935376f>, (May 15, 2017), 8 pgs.
"U.S. Appl. No. 17/565,648, Non Final Office Action mailed Aug. 29, 2024", 40 pgs.
"U.S. Appl. No. 18/435,793, Non Final Office Action mailed Sep. 10, 2024", 25 pgs.
"International Application Serial No. PCT/US2023/011032, International Preliminary Report on Patentability mailed Aug. 2, 2024", 12 pgs.
Walk-Morris, Tatiana, "Amazon debuts AR tool for viewing multiple furniture items in one room", Retail Dive, Dive Brief, (Aug. 27, 2020), 2 pgs.
"International Application Serial No. PCT US2022 052696, International Preliminary Report on Patentability mailed Jul. 11, 2024", 12 pgs.
"International Application Serial No. PCT US2022 052700, International Preliminary Report on Patentability mailed Jul. 11, 2024", 13 pgs.
"International Application Serial No. PCT US2022 053618, International Preliminary Report on Patentability mailed Jul. 11, 2024", 10 pgs.
"International Application Serial No. PCT US2022 053622, International Preliminary Report on Patentability mailed Jul. 11, 2024", 12 pgs.

* cited by examiner

HOME BASED AUGMENTED REALITY SHOPPING

TECHNICAL FIELD

The present disclosure relates generally to providing augmented reality experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
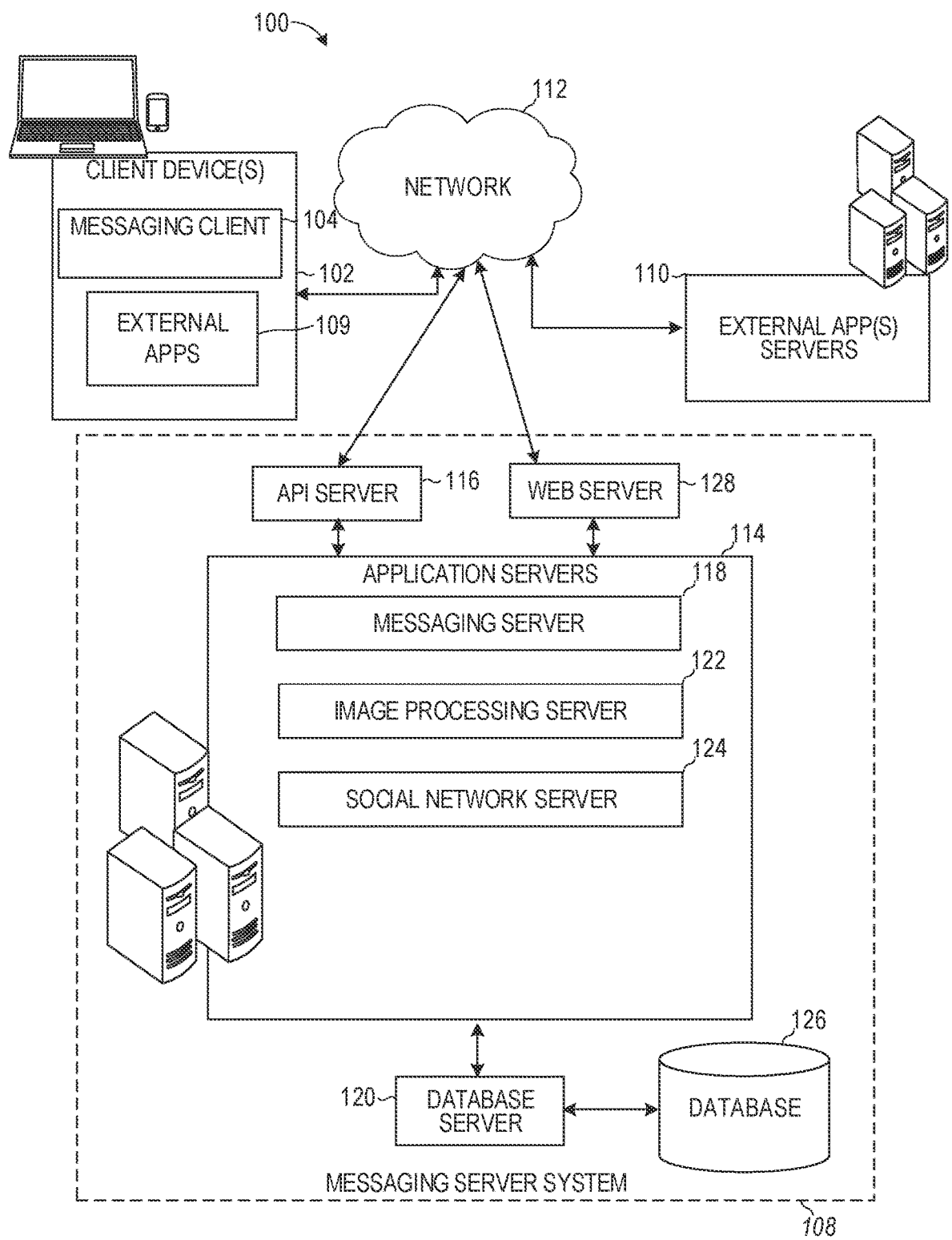
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) systems allow users to add augmented reality elements to their environment (e.g., captured image data corresponding to a user's surroundings). Such systems can recommend AR elements based on various external factors, such as a current geographical location of the user and various other contextual clues. Some AR systems allow a user to capture a video of a room and select from a list of available AR elements to add to a room to see how the selected AR element looks in the room. These systems allow a user to preview how a physical item looks at a particular location in a user's environment, which simplifies the purchasing process. While these systems generally work well, they require a user to manually select which AR elements to display within the captured video. Specifically, the user of these systems has to spend a great deal of effort searching through and navigating multiple user interfaces and pages of information to identify an item of interest. Then the user has to manually position the selected item within view. These tasks can be daunting and time consuming, which detracts from the overall interest of using these systems and results in wasted resources.

The disclosed techniques improve the efficiency of using an electronic device which implements or otherwise accesses an AR/VR system by intelligently automatically determining what room or environment is within view of a camera and automatically recommending AR elements to display within the camera view, such as for a user to purchase corresponding physical or electronically consumable items (e.g., video items, music items, or video game items). Specifically, the disclosed techniques receive a video that includes a depiction of one or more objects in a room within a home. The disclosed techniques determine a room classification for the room by processing the one or more objects depicted in the video and select one or more augmented reality items available for purchase based on the room classification and the one or more objects depicted in the video. The disclosed techniques generate, for display within the video, the one or more augmented reality items that have been selected at a display position within the video corresponding to the one or more objects depicted in the video.

In some cases, the disclosed techniques train a neural network classifier to determine the room classification. To train the neural network classifier, the disclosed techniques receive training data comprising a plurality of training images and ground truth room classifications for each of the plurality of training images, each of the plurality of training monocular images depicting a different room in a home, and apply the neural network classifier to a first training image of the plurality of training images to estimate a room classification of the room in the home depicted in the first training image. The disclosed techniques compute a deviation between the estimated room classification and the ground truth room classification associated with the first training image and update parameters of the neural network classifier based on the computed deviation.

In this way, the disclosed techniques can select and automatically display one or more AR elements corresponding to items available for purchase in the current image or video without further input from a user. This improves the overall experience of the user in using the electronic device and reduces the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications (also referred to as "external applications" and "external apps") 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
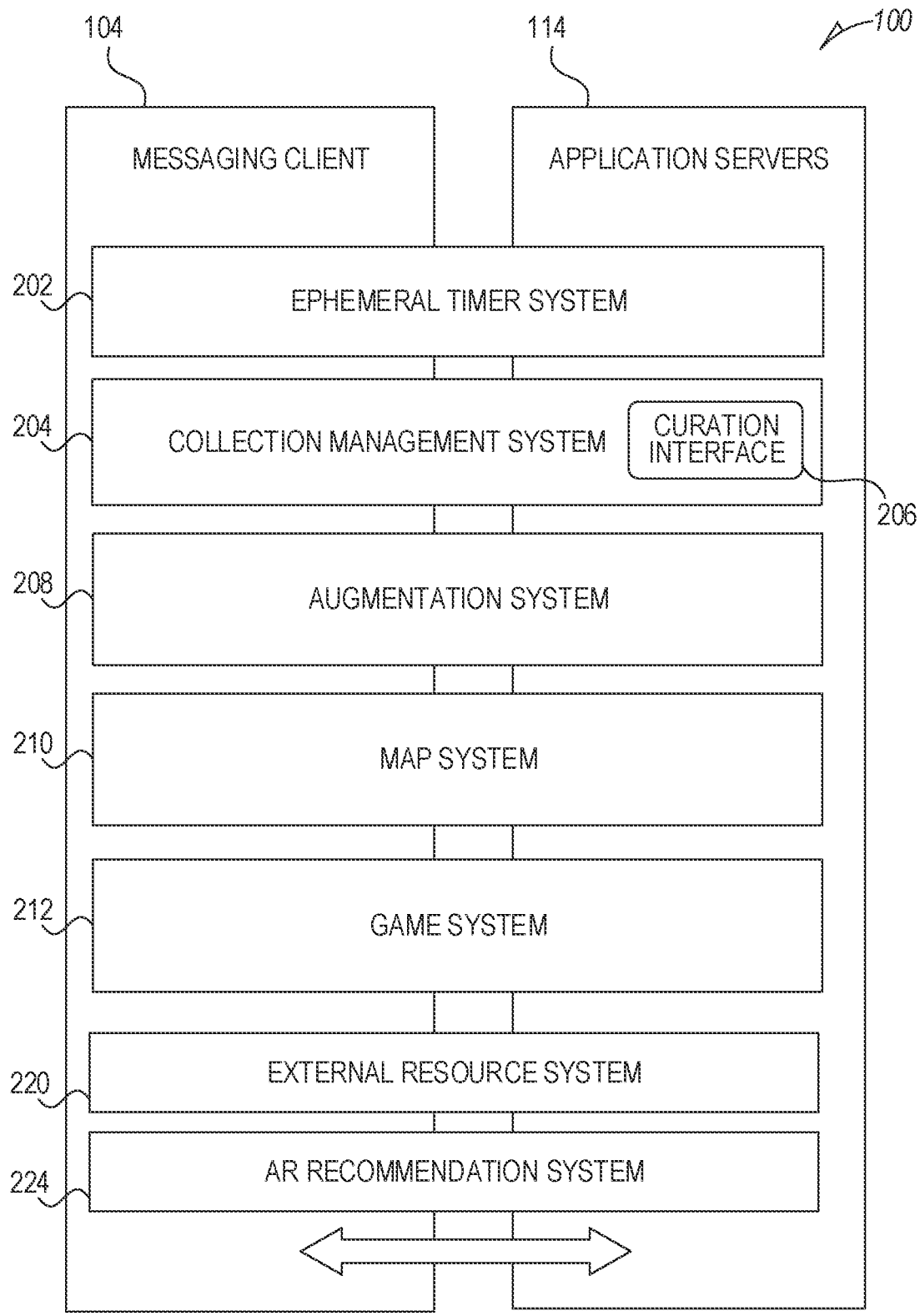
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., launching a home-based AR shopping experience, as discussed in connection with FIGS. 6-10 below).

Figure 3:
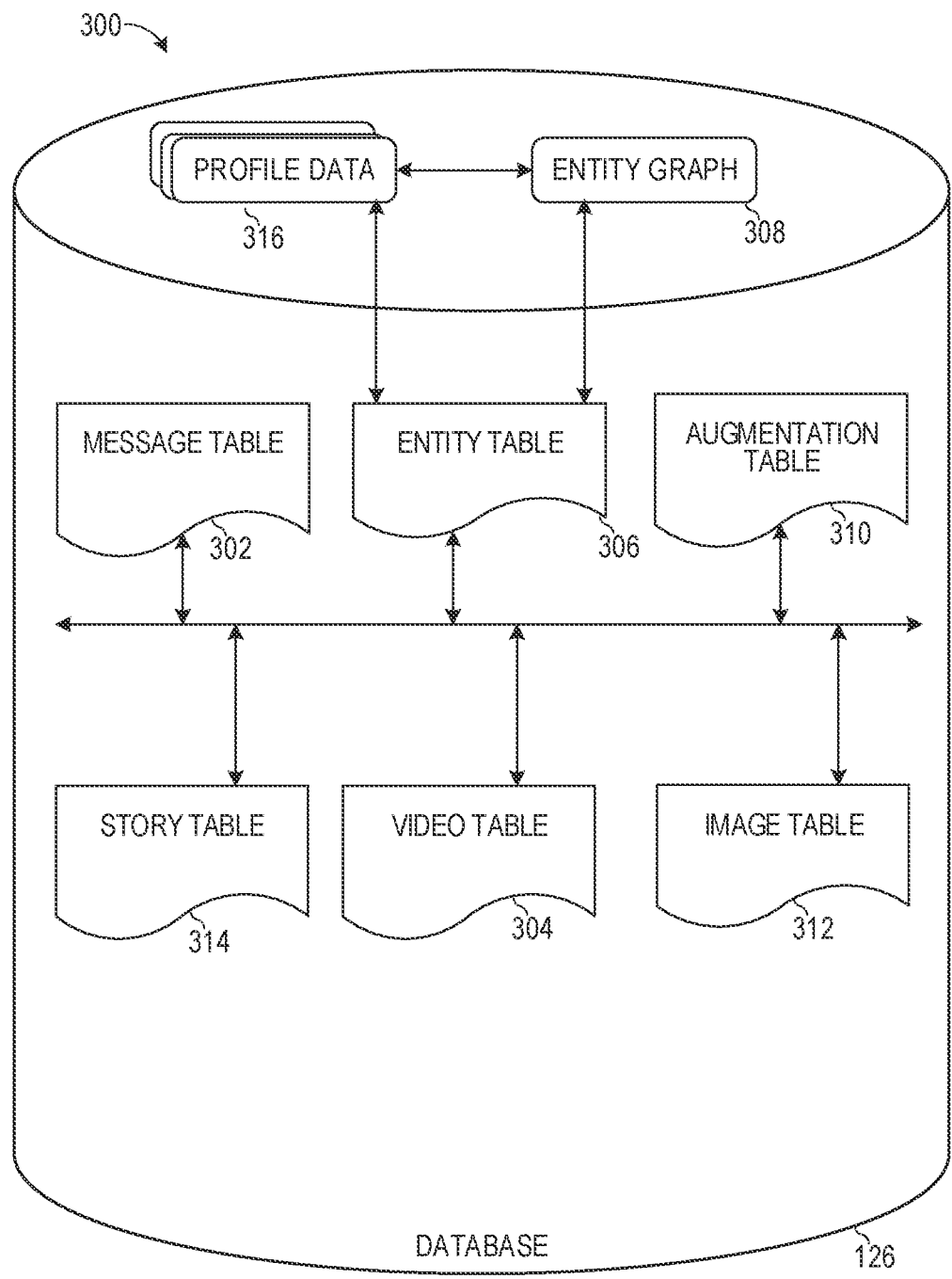
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external resource or app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a.*js file or a .json file) and a style sheet (e.g., a .*ss file).

In response to receiving a user selection of the option to launch or access features of the external resource (e.g., external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external applications 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access to the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR recommendation system 224 receives an image or video from a client device 102 that depicts a room in a home. The AR recommendation system 224 detects one or more real-world objects depicted in the image or video and uses the detected one or more real-world objects (or features of the room) to compute a classification for the room. For example, the AR recommendation system 224 can classify the room as a kitchen, a bedroom, a nursery, a toddler room, a teenager room, an office, a living room, a den, a formal living room, a patio, a deck, a balcony, a bathroom, or any other suitable home-based room classification. Once classified, the AR recommendation system 224 identifies one or more items (such as physical products or electronically consumable content items) related to the room classification. The identified one or more items can be items that are available for purchase. The AR recommendation system 224 retrieves AR representations of the identified items and incorporates (displays at specified positions) the AR representations within the image or video. The AR representations can be interactive, such that upon receiving a user selection or input that selects the particular AR representation, an electronic commerce (e-commerce) purchase transaction is performed to obtain access to or receive the corresponding item. An illustrative implementation of the AR recommendation system 224 is shown and described in connection with FIG. 5 below.

The AR recommendation system 224 is a component that can be accessed by an AR/VR application implemented on the client device 102. The AR/VR application uses an RGB camera to capture an image of a room in a home. The AR/VR application applies various trained machine learning techniques on the captured image of the room to classify the room. The AR/VR application includes a depth sensor to generate a virtual mesh of the room that is captured in order to incorporate or place into the image or video the AR representations. For example, the AR/VR application can add an AR piece of furniture, such as an AR chair or sofa, to the image or video that is captured by the client device 102. In some implementations, the AR/VR application continuously captures images of the house or home in real time or periodically to continuously or periodically update the AR representations of items available for purchase. This allows the user to move around in the real world and see updated AR representations of items available for purchase corresponding to a current room depicted in an image or video in real time.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such a method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The data structures 300 can also store training data for training one or more machine learning techniques (models) to classify a room in a home or household. The training data can include a plurality of images and videos and their corresponding ground-truth room classifications. The images and videos can include a mix of all sorts of real-world objects that can appear in different rooms in a home or household. The one or more machine learning techniques can be trained to extract features of a received input image or video and establish a relationship between the extracted features and a room classification. Once trained, the machine learning technique can receive a new image or video and can compute a room classification for the newly received image or video.

The data structures 300 can also store a list or plurality of different expected objects for different room classifications. For example, the data structures 300 can store a first list of expected objects for a first room classification. Namely, a room classified as a kitchen can be associated with a list of expected objects, such as appliances and/or furniture items including: tea maker, toaster, kettle, mixer, refrigerator, blender, cabinet, cupboard, cooker hood, range hood, microwave, dish soap, kitchen counter, dinner table, kitchen scale, pedal bin, grill, and drawer. As another example, a room classified as a living room can be associated with a list of expected objects including: wing chair, TV stand, sofa, cushion, telephone, television, speaker, end table, tea set, fireplace, remote, fan, floor lamp, carpet, table, blinds, curtains, picture, vase, and grandfather clock.

As another example, a room classified as a bedroom can be associated with a list of expected objects, such as furniture items including: headboard, footboard and mattress frame, mattress and box springs, mattress pad, sheets and pillowcases, blankets, quilts, comforter, bedspread, duvet, bedskirt, sleeping pillows, specialty pillows, decorative pillows, pillow covers and shams, throws (blankets), draperies, rods, brackets, valances, window shades, blinds, shutters, nightstands, occasional tables; lamps; floor, table, hanging; wall sconces, alarm clock, radio, plants and plant containers, vases, flowers, candles, candleholders, artwork, posters, prints, photos, frames, photo albums, decorative objects and knick-knacks, dressers and clothing, armoire, closet, TV cabinet, chairs, loveseat, chaise lounge, ottoman, bookshelves, decorative ledges, books, magazines, bookends, trunk, bench, writing desk, vanity table, mirrors, rugs, jewelry boxes and jewelry, storage boxes, baskets, trays, telephone; television, cable box, satellite box, DVD player and videos, tablets, nightlight.

Data Communications Architecture

Figure 4:
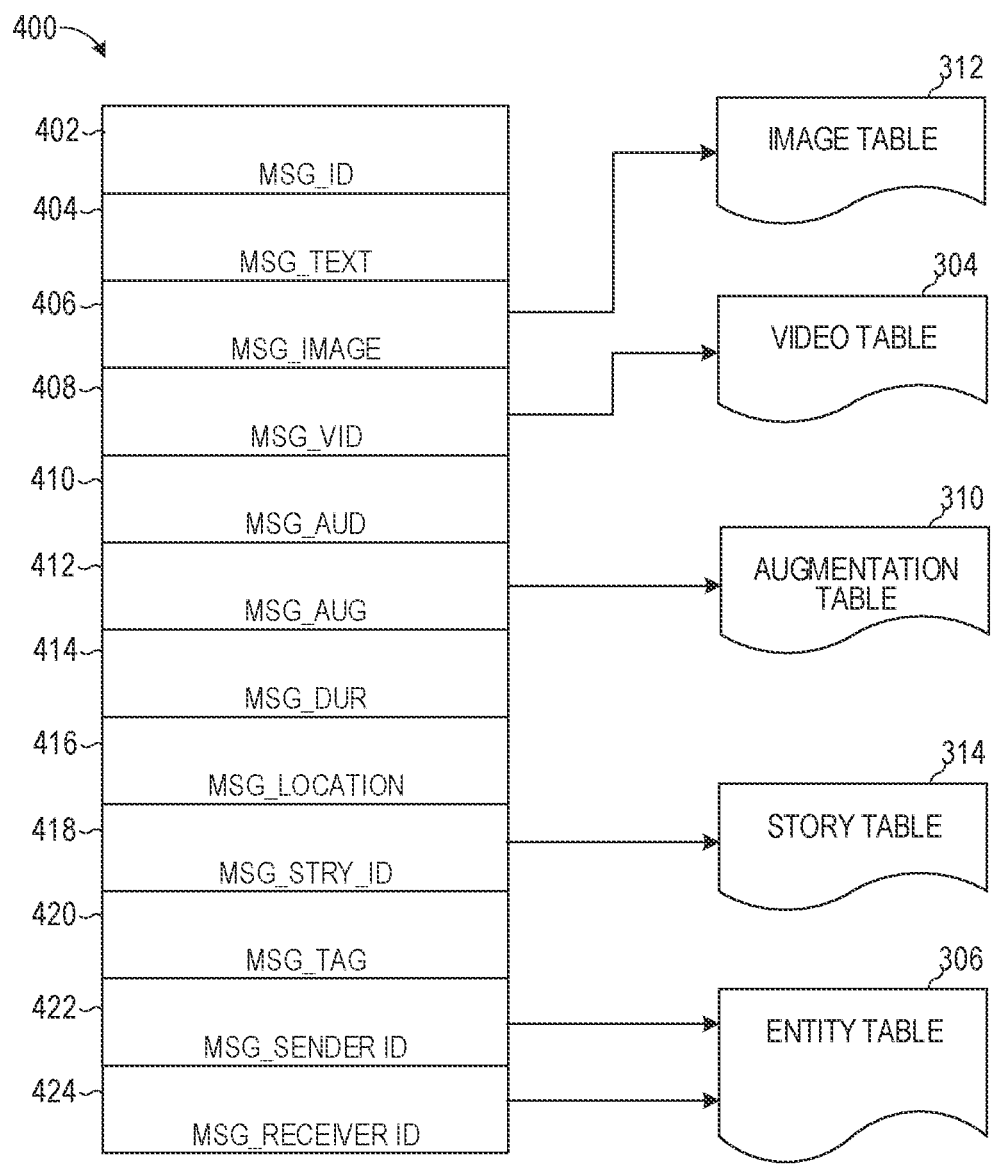
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

AR Recommendation System

Figure 5:
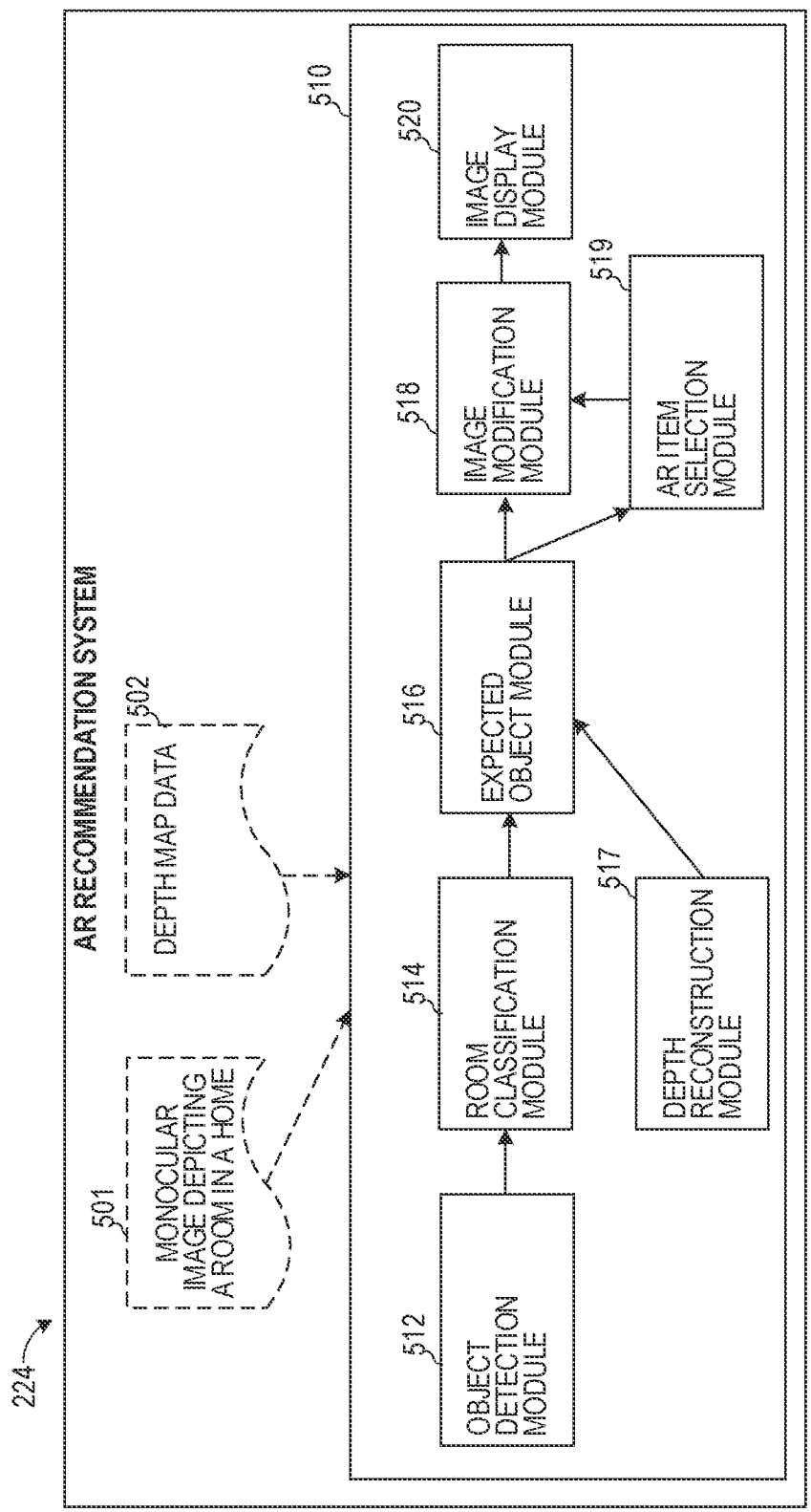
FIG. 5 is a block diagram showing an example AR recommendation system, according to example examples.

FIG. 5 is a block diagram showing an example AR recommendation system 224, according to example examples. The AR recommendation system 224 includes a set of components 510 that operate on a set of input data (e.g., a monocular image (or video) depicting a room in a home 501 and depth map data 502. The AR recommendation system 224 includes an object detection module 512, a room classification module 514, a depth reconstruction module 517, an expected object module 516, an image modification module 518, an AR item selection module 519, and an image display module 520. All or some of the components of the AR recommendation system 224 can be implemented by a server, in which case, the monocular image depicting a room in a home 501 and the depth map data 502 are provided to the server by the client device 102. In some cases, some or all of the components of the AR recommendation system 224 can be implemented by the client device 102.

The object detection module 512 receives a monocular image (or video) depicting a room in a home 501. This image can be received as part of a real-time video stream, a previously captured video stream or a new image captured by a camera of the client device 102. The object detection module 512 applies one or more machine learning techniques to identify real-world physical objects that appear in the image depicting a room in a home 501. For example, the object detection module 512 can segment out individual objects in the image and assign a label or name to the individual objects. Specifically, the object detection module 512 can recognize a sofa as an individual object, a television as another individual object, a light fixture as another individual object, and so forth. Any type of object that can appear or be present in a particular home or household can be recognized and labeled by the object detection module 512.

The object detection module 512 provides the identified and recognized objects to the room classification module 514. The room classification module 514 can compute or determine a room classification of the room depicted in the image depicting the room in the home 501 based on the identified and recognized objects received from the object detection module 512. In some implementations, the room classification module 514 compares the objects received from the object detection module 512 to a plurality of lists of expected objects each associated with a different room classification that is stored in data structures 300. For example, the room classification module 514 can compare the objects detected by the object detection module 512 to a first list of expected objects associated with a living room classification. The room classification module 514 can compute a quantity or percentage of the objects that are detected by the object detection module 512 and that are included in the first list. The room classification module 514 can assign a relevancy score to the first list. The room classification module 514 can then similarly compare the objects detected by the object detection module 512 to a second list of expected objects associated with another room classification (e.g., a kitchen). The room classification module 514 can then compute a quantity or percentage of the objects that are detected by the object detection module 512 and that are included in the second list and can assign a relevancy score to the second list. The room classification module 514 can identify which of the lists that are stored in the data structures 300 is associated with a highest relevancy score. The room classification module 514 can then determine or compute the room classification of the room depicted in the image depicting the room in the home 501 based on the room classification associated with the identified list of expected objects with the highest relevancy score.

In another implementation, the room classification module 514 can implement one or more machine learning techniques to classify a room in a home or household. The machine learning techniques can implement a classifier neural network that is trained to establish a relationship between one or more features of an image of a room in a home with a corresponding room classification.

During training, the machine learning technique of the room classification module 514 receives a given training image (e.g., a monocular image or video depicting a real-world room in a home, such as an image of a living room or bedroom) from training image data stored in data structures 300. The room classification module 514 applies one or more machine learning techniques on the given training image. The room classification module 514 extracts one or more features from the given training image to estimate a room classification for the room depicted in the image or video. For example, the room classification module 514 obtains the given training image depicting a room in a home and extracts features from the image that correspond to the real-world objects that appear in the room. In some cases, rather than receiving an image depicting a room in a home, the room classification module 514 receives a list or plurality of objects detected by another module or machine learning technique. The room classification module 514 is trained to determine a room classification based on the features of the objects received from the other machine learning technique.

The room classification module 514 determines the relative positions of the detected real-world objects and/or features of the image depicting the room in the home. The room classification module 514 then estimates or computes a room classification based on the relative positions of the detected real-world objects and/or features of the image depicting the room in the home. The room classification module 514 obtains a known or predetermined ground-truth room classification of the room depicted in the training image from the training data. The room classification module 514 compares the estimated room classification with the ground truth room classification. Based on a difference threshold of the comparison, the room classification module 514 updates one or more coefficients or parameters and obtains one or more additional training images of a room in a home. In some cases, the room classification module 514 is first trained on a set of images associated with one room classification and is then trained on another set of images associated with another room classification.

After a specified number of epochs or batches of training images have been processed and/or when a difference threshold (computed as a function of a difference between the estimated classification and the ground-truth classification) reaches a specified value, the room classification module 514 completes training and the parameters and coefficients of the room classification module 514 are stored as a trained machine learning technique or trained classifier.

In some cases, multiple classifiers are trained in parallel or sequentially on different sets of training data corresponding to different room classifications. For example, a first classifier can be trained to classify a living room based on a first set of training images that depict different living room features. A second classifier can be trained to classify a bedroom based on a second set of training images that depict different bedroom features. The bedroom classifier can also provide an output that provides an estimated age of the person associated with the bedroom. In this way, the bedroom classifier can indicate that the bedroom is a master or guest bedroom (if the estimated age is within a first range), a nursery (if the estimated age is within a second range of ages that are younger than the ages of the first range), a toddler room (if the estimated age range is within a third range), or a teenager room (if the estimated age range is within a fourth range). In such circumstances, multiple classifiers can operate on a same input image and can generate a room classification with a given score that indicates how accurate the generated room classification is. The room classification module 514 obtains the scores and classifications from all of the multiple classifiers and then assigns the room classification to the input image depicting the room in a home 501 based on the room classification with the highest score.

In an example, after training, the room classification module 514 receives an input image depicting a room in a home 501 as a single RGB image from a client device 102 or as a video of multiple images. The room classification module 514 applies the trained machine learning technique (s) to the received input image to extract one or more features and to generate a prediction or estimation or room classification of the image depicting a room in a home 501.

The room classification module 514 provides the room classification to the expected object module 516. The expected object module 516 obtains a list or plurality of expected objects stored in the data structures 300 that is associated with the room classification. For example, the expected object module 516 obtains list of expected objects (furniture items) including: headboard, footboard and mattress frame, mattress and box springs, mattress pad, sheets and pillowcases, blankets, quilts, comforter, bedspread, duvet, bedskirt, sleeping pillows, specialty pillows, decorative pillows, pillow covers and shams, throws (blankets), draperies, rods, brackets, valances, window shades, blinds, shutters, nightstands, occasional tables; lamps: floor, table, hanging; wall sconces, alarm clock, radio, plants and plant containers, vases, flowers, candles, candleholders, artwork, posters, prints, photos, frames, photo albums, decorative objects and knick-knacks, dressers and clothing, armoire, closet, TV cabinet, chairs, loveseat, chaise lounge, ottoman, bookshelves, decorative ledges, books, magazines, bookends, trunk, bench, writing desk, vanity table, mirrors, rugs, jewelry boxes and jewelry, storage boxes, baskets, trays, telephone; television, cable box, satellite box, DVD player and videos, tablets, nightlight.

The expected object module 516 compares the listed items from the retrieved list of expected objects with the objects detected by the object detection module 512 and/or with the objects identified by the machine learning technique implemented by the room classification module 514. The expected object module 516 can determine that a particular expected object is missing from the list of detected objects. For example, the expected object module 516 can determine that the room classification is a bedroom and that a bed furniture item is missing from the list of objects provided by the object detection module 512 or room classification module 514. In such cases, the expected object module 516 can select a bed as a furniture item to recommend to a user to purchase for inclusion in the room depicted in the image captured by the client device 102. Specifically, the expected object module 516 provides the identifier of the bed furniture item to the AR item selection module 519. The AR item selection module 519 can then search for and retrieve an AR representation of the bed furniture item from a list of AR representations of beds and can instruct the image modification module 518 to incorporate the AR representation of the bed furniture item into the image captured by the client device 102. In some cases, the AR item selection module 519 provides an indication of where to place the AR representation relative to one or more other real-world objects depicted in the image. After the AR representation is incorporated into the image, the image display module 520 generates for display an image that includes the AR representation of the bed furniture item together with other real-world objects (real-world furniture items) depicted in the image captured by the client device 102.

As another example, the expected object module 516 can determine that a particular expected object is missing from the list of detected objects, such as an appliance is missing from the kitchen that is depicted in the image. For example, the expected object module 516 can determine that the room classification is a kitchen (e.g., in response to detecting a sink and stove among objects depicted in a video) and that a mixer kitchen appliance is missing from the list of objects provided by the object detection module 512 or room classification module 514. In such cases, the expected object module 516 can select a mixer appliance as an appliance item to recommend to a user to purchase for inclusion in the room depicted in the image captured by the client device 102. Specifically, the expected object module 516 provides the identifier of the mixer appliance to the AR item selection module 519. The AR item selection module 519 can then search for and retrieve an AR representation of the mixer appliance from a list of AR representations of mixer appliances and can instruct the image modification module 518 to incorporate the AR representation of the mixer appliance into the image captured by the client device 102. In some cases, the AR item selection module 519 provides an indication of where to place the AR representation relative to one or more other real-world objects depicted in the image. After the AR representation is incorporated into the image, the image display module 520 generates for display an image that includes the AR representation of the mixer appliance together with other real-world objects (real-world furniture items) depicted in the image captured by the client device 102. The client device 102 can receive a user input that selects the AR representation and in response completes a purchase transaction for the mixer appliance associated with the AR representation.

As another example, the expected object module 516 can determine that a particular expected object matches a given object from the list of detected objects, such as an appliance in the kitchen. For example, the expected object module 516 can determine that the room classification is a kitchen (e.g., in response to detecting a refrigerator among objects depicted in a video) and that the refrigerator appliance is included in the list of objects provided by the object detection module 512 or room classification module 514. In such cases, the expected object module 516 can retrieve a recipe associated with the kitchen appliance from the list. Specifically, the AR item selection module 519 can then search for and retrieve an AR representation of the recipe and can instruct the image modification module 518 to incorporate the AR representation of the recipe into the image captured by the client device 102, such as to place the recipe on top of or next to the refrigerator depicted in the image. In some cases, the AR representation of the recipe is provided together with the AR representation of the mixer appliance that is incorporated into the image.

In some implementations, the expected object module 516 can identify multiple objects that are in the expected list of objects for the room classification and which are missing from the list of objects provided by the object detection module 512 or room classification module 514. In such circumstances, the expected object module 516 can assign a rank or score to each of the missing objects and can select a set of two or three expected objects associated with higher scores or ranks than other non-selected expected objects that are missing. The score can be assigned based on an importance level of the expected object that is stored in association with each expected object in the list stored in the data structures 300. For example, the expected object module 516 can determine that the room classification is a living room and that a sofa, coffee table, and rug furniture items are missing from the list of objects provided by the object detection module 512 or room classification module 514. In such cases, the expected object module 516 can determine that the sofa and coffee table furniture items have higher scores than the rug furniture item and can in response select only the sofa and coffee table as furniture items to recommend to a user to purchase for inclusion in the room depicted in the image captured by the client device 102 and can exclude the rug furniture item. The expected object module 516 provides the identifier of the sofa and coffee table furniture items to the AR item selection module 519. The AR item selection module 519 can then search for and retrieve AR representations of the sofa and coffee table furniture items from a list of AR representations and can instruct the image modification module 518 to incorporate the AR representations of the sofa and coffee table furniture items into the image captured by the client device 102. In some cases, the AR item selection module 519 provides an indication of where to place the AR representations relative to one or more other real-world world objects depicted in the image. After being incorporated into the image, the image display module 520 generates for display an image that includes the AR representations of the sofa and coffee table furniture items together with other real-world objects depicted in the image captured by the client device 102.

The depth reconstruction module 517 receives depth map data 502 from a depth sensor or depth camera of the client device 102. The depth map data 502 is associated with the image or video being processed by the room classification module 514 and the expected object module 516. The depth reconstruction module 517 can generate a three-dimensional (3D) mesh representation or reconstruction of the room depicted in the image captured by the client device 102. The depth reconstruction module 517 can provide the 3D mesh representation or reconstruction of the room to the expected object module 516.

Based on the 3D mesh representation or reconstruction, the expected object module 516 can further refine which objects from the expected object list to recommend to the user to purchase. For example, the expected object module 516 can determine that the room classification is a living room and that furniture items including a sofa, coffee table, and rug are missing from the list of objects provided by the object detection module 512 or room classification module 514. The expected object module 516 can also process the 3D mesh representation of the room to compute an amount of available physical space remaining in the room depicted in the image. In response, the expected object module 516 can determine that only the coffee table furniture item can physically fit within the dimensions of the room and that the room cannot physically fit all three missing furniture items. Namely, the room can only fit the coffee table furniture item and not the sofa and the rug furniture items. In such cases, the expected object module 516 can in response select only the coffee table furniture item as objects to recommend to a user to purchase for inclusion in the room depicted in the image captured by the client device 102. The expected object module 516 provides the identifier of the coffee table furniture item to the AR item selection module 519. The AR item selection module 519 can then search for and retrieve an AR representation of the coffee table furniture item from a list of AR representations of objects that fit within the dimensions of the room and can instruct the image modification module 518 to incorporate the AR representation of the coffee table furniture item into the image captured by the client device 102. In some cases, the AR item selection module 519 provides an indication of where to place the AR representation relative to one or more other real-world objects (furniture items) depicted in the image based on the 3D mesh representation or reconstruction. After the AR representation is incorporated into the image, the image display module 520 generates for display an image that includes the AR representation of the coffee table furniture item together with other real-world objects depicted in the image captured by the client device 102.

As another example, based on the 3D mesh representation or reconstruction, the expected object module 516 can further refine which objects from the expected object list to recommend to the user to purchase that fit better within the physical space of the room. For example, the expected object module 516 can determine that the room classification is a living room and that a sofa is included in the list of objects provided by the object detection module 512 or room classification module 514. Namely, the expected object module 516 can determine that a sofa matches an object in an expected list of objects for the living room. The expected object module 516 can also process the 3D mesh representation of the room to compute an amount of available physical space in the room depicted in the image and how much space the sofa consumes or takes up. In response, the expected object module 516 can determine that another object of the same type (e.g., a different sofa) that has different physical dimensions (larger or smaller than the detected object) can physically fit better (satisfies one or more fit parameters of the 3D mesh representation or reconstruction) within the dimensions of the room. In such cases, the expected object module 516 can in response select an alternate sofa as an object to recommend to a user to purchase for inclusion in the room depicted in the image captured by the client device 102. The expected object module 516 provides the identifier of the sofa to the AR item selection module 519. The AR item selection module 519 can then search for and retrieve an AR representation of the sofa from a list of AR representations of objects that fit within the dimensions of the room and can instruct the image modification module 518 to incorporate the AR representation of the sofa into the image captured by the client device 102. In this case, the AR item selection module 519 provides an indication to replace an existing real-world object depicted in the image with the AR representation that has been selected. This allows the user to see how a different sofa would look in the room if it were purchased to replace the existing sofa that is in the room.

In some implementations, the expected object module 516 can receive an age range of a person associated with the room classification of the room depicted in the image captured by the client device 102. The expected object module 516 can identify a list of objects associated with the age range of the person, such as a list of toys corresponding to the age range. The expected object module 516 provides the identifier of the list of objects (e.g., the list of toys) to the AR item selection module 519. The AR item selection module 519 can then search for and retrieve AR representations of the list of toys from a list of AR representations and can instruct the image modification module 518 to incorporate the AR representations of the toys into the image captured by the client device 102. In some cases, the AR item selection module 519 provides an indication of where to place the AR representations relative to one or more other real-world world objects depicted in the image, such as on the floor of the room depicted in the image. After the AR representations are incorporated into the image, the image display module 520 generates for display an image that includes the AR representations of the toys together with other real-world objects depicted in the image captured by the client device 102. The client device 102 can receive a user input that selects one or more of the AR representations of the toys. In response, the client device 102 completes a purchase transaction for the corresponding toy associated with the selected AR representation.

Figure 6:
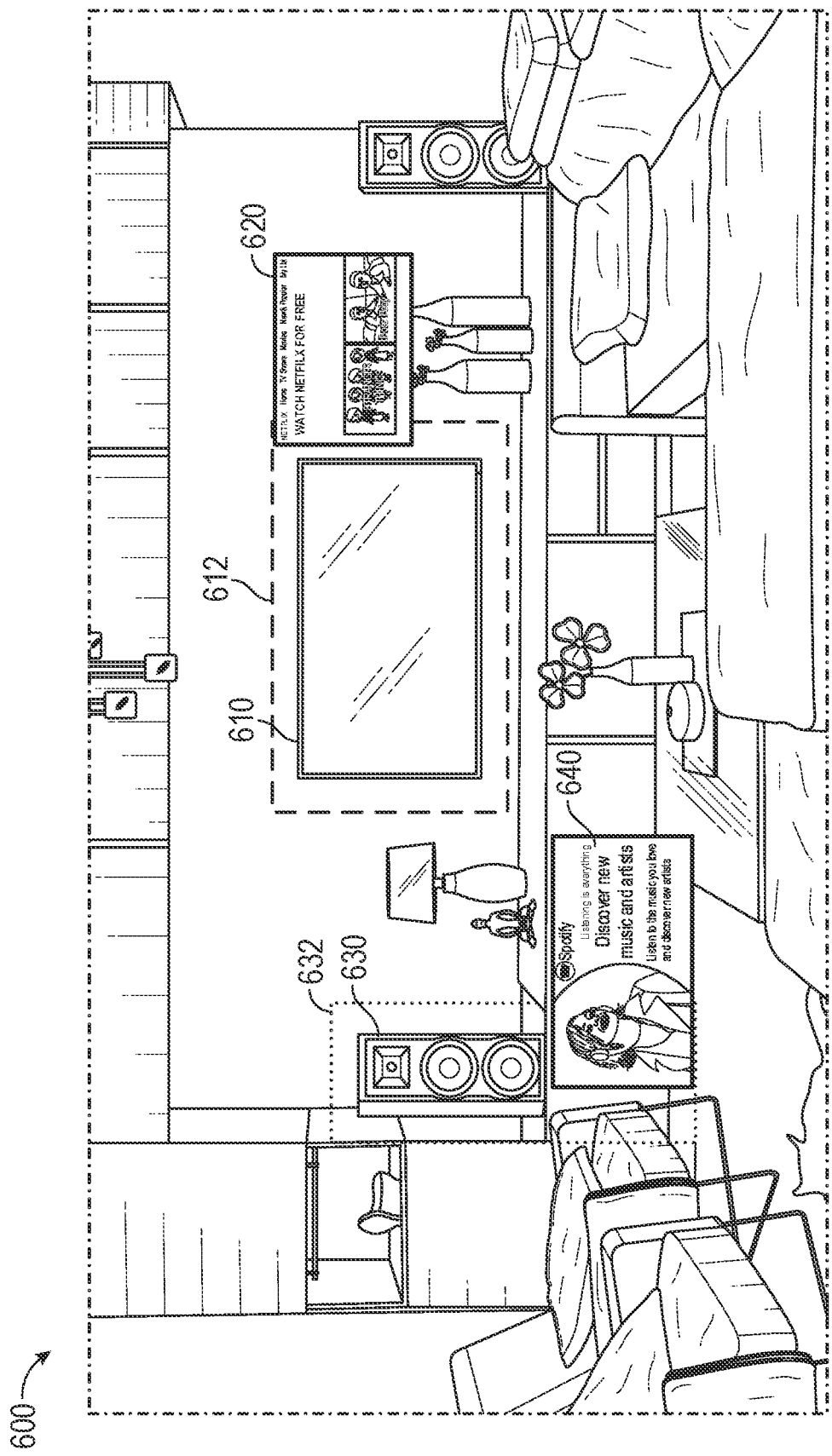
FIGS. 6-9 are diagrammatic representations of outputs of the AR recommendation system, in accordance with some examples.

FIGS. 6-9 are diagrammatic representations of outputs of the AR recommendation system, in accordance with some examples. Specifically, as shown in FIG. 6, the AR recommendation system 224 receives an image or video 600 that depicts a room in a home. The AR recommendation system 224 applies one or more machine learning techniques to detect and recognize one or more real-world objects that are depicted in the image or video 600. For example, the AR recommendation system 224 detects and recognizes a speaker 630 and a television 610 among other objects (e.g., a sofa, a rug, a flower pot, a coffee table, and so forth).

Based on the detected and recognized objects, the AR recommendation system 224 determines that the room depicted in the image or video 600 corresponds to a living room classification. In response, the AR recommendation system 224 obtains a list of expected objects associated with the living room classification. The AR recommendation system 224 determines that the television 610 matches a given one of the objects in the list of expected objects. In response, the AR recommendation system 224 displays a first indicator (e.g., a blue border) around the real-world television 610 that is depicted in the image or video 600. The object that is matched is associated with a video item that is available for electronic consumption. In such cases, the AR recommendation system 224 obtains an AR element or representation 620 of the video item. The AR recommendation system 224 displays the AR element or representation 620 of the video item (including an image of the video item, a title, and access information) next to or on top of the television 610. The AR recommendation system 224 can receive a user selection of the AR element or representation 620 and in response the AR recommendation system 224 can complete a purchase transaction or can otherwise access the video item corresponding to the AR element or representation 620. In some cases, the AR recommendation system 224 displays the video item corresponding to the AR element or representation 620 on the television 610 in response to receiving the user selection of the AR element or representation 620.

As another example, the AR recommendation system 224 also determines that the speaker 630 matches a given one of the objects in the list of expected objects. In response, the AR recommendation system 224 displays a second indicator (e.g., a red border) around the real-world speaker 630 that is depicted in the image or video 600. The object that is matched is associated with an audio item that is available for electronic consumption. In such cases, the AR recommendation system 224 obtains an AR element or representation 640 of the audio item. The AR recommendation system 224 displays the AR element or representation 640 of the audio item (including an image of the audio item, a title, and access information) next to or on top of the speaker 630 (together with the AR element or representation 620 displayed next to or on top of the television 610). The AR recommendation system 224 can receive a user selection of the AR element or representation 640 and in response the AR recommendation system 224 can complete a purchase transaction or can otherwise access the audio item corresponding to the AR element or representation 640. In some cases, the AR recommendation system 224 instructs the speaker 630 to begin playing back the audio item corresponding to the AR element or representation 640 in response to receiving the user selection of the AR element or representation 640.

Figure 7:
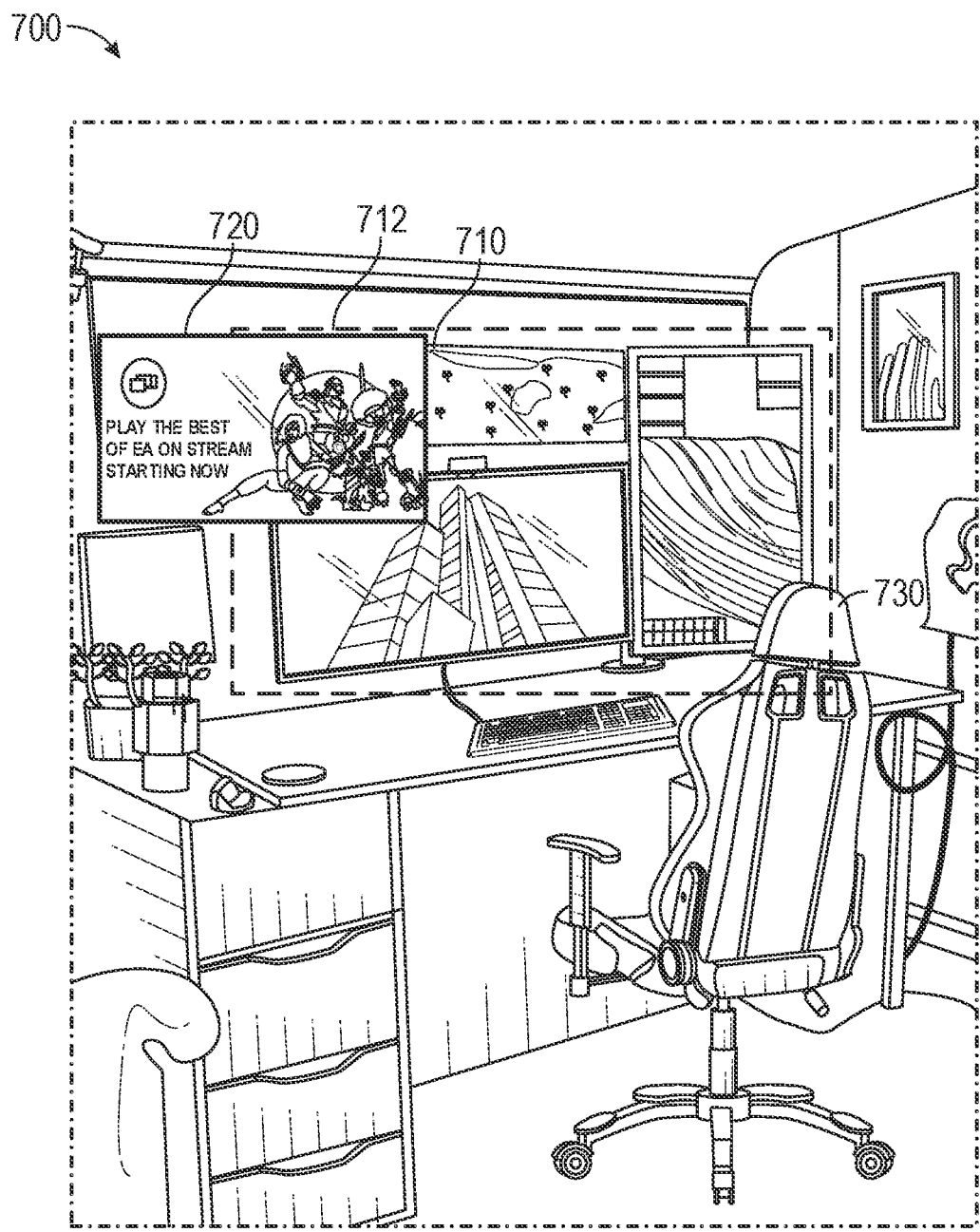

As shown in FIG. 7, the AR recommendation system 224 receives an image or video 700 that depicts a room in a home. The AR recommendation system 224 applies one or more machine learning techniques to detect and recognize one or more real-world objects that are depicted in the image or video 700. For example, the AR recommendation system 224 detects and recognizes a desk and a computer monitor 710 among other objects.

Based on the detected and recognized objects, the AR recommendation system 224 determines that the room depicted in the image or video 700 corresponds to an office room classification. In response, the AR recommendation system 224 obtains a list of expected objects associated with the office room classification. The AR recommendation system 224 determines that the computer monitor 710 matches a given one of the objects in the list of expected objects. In response, the AR recommendation system 224 displays a first indicator (e.g., a yellow border) around the real-world computer monitor 710 that is depicted in the image or video 700. The object that is matched is associated with a video game item that is available for electronic consumption. In such cases, the AR recommendation system 224 obtains an AR element or representation 720 of the video game item. The AR recommendation system 224 displays the AR element or representation 720 of the video game item (including an image of the video game item, a title, and access information) next to or on top of the computer monitor 710. The AR recommendation system 224 can receive a user selection of the AR element or representation 720 and in response the AR recommendation system 224 can complete a purchase transaction or can otherwise access the video game item corresponding to the AR element or representation 720.

In some example, the AR recommendation system 224 determines the list of expected items associated with the office room classification is missing one or more of the objects that are detected and recognized in the image or video 700. For example, the AR recommendation system 224 determines that an office chair is in the list of expected items but is missing from the list of objects that have been detected and recognized. In response, the AR recommendation system 224 generates a 3D mesh representation or reconstruction of the room depicted in the image or video 700. The AR recommendation system 224 identifies an office chair that is available for purchase and that satisfies one or more fit parameters based on the 3D mesh representation or reconstruction of the room. Namely, the AR recommendation system 224 identifies an office chair that fits within the available physical space and dimensions of the real-world office table depicted in the image or video 700. The AR recommendation system 224 searches for and generates an AR representation 730 corresponding to the identified office chair that is available for purchase. The AR recommendation system 224 determines that the office chair belongs next to the office table depicted in the image or video 700. In response, the AR recommendation system 224 displays the AR representation 730 of the office chair next to the real-world table depicted in the image or video 700. This allows the user to see how an office chair would look in the user's office room before purchasing the office chair.

In some cases, the AR recommendation system 224 determines that an office chair (a piece of furniture) exists in the image or video 700. The AR recommendation system 224 obtains the 3D mesh representation or reconstruction of the room and determines that the existing office chair fails to satisfy one or more fit parameters for the room. For example, the AR recommendation system 224 determines that the existing office chair is too large or too small for the room. In such cases, the AR recommendation system 224 identifies an office chair (an alternate or different furniture item) that is available for purchase and that satisfies one or more fit parameters based on the 3D mesh representation or reconstruction of the room. Namely, the AR recommendation system 224 identifies an office chair furniture item that fits within the available physical space and dimensions of the real-world office table depicted in the image or video 700. The AR recommendation system 224 searches for and generates an AR representation 730 corresponding to the identified office chair furniture item that is available for purchase. The AR recommendation system 224 replaces the existing office chair in the image or video 700 with the AR representation 730 of the office chair furniture item. In some cases, the AR recommendation system 224 positions the AR representation 730 of the office chair in the same place as the existing office chair after the real-world office chair is removed or deleted from the image or video 700. This allows the user to see how a different office chair (piece of furniture) would look in the user's office room before purchasing the office chair.

Figure 8:
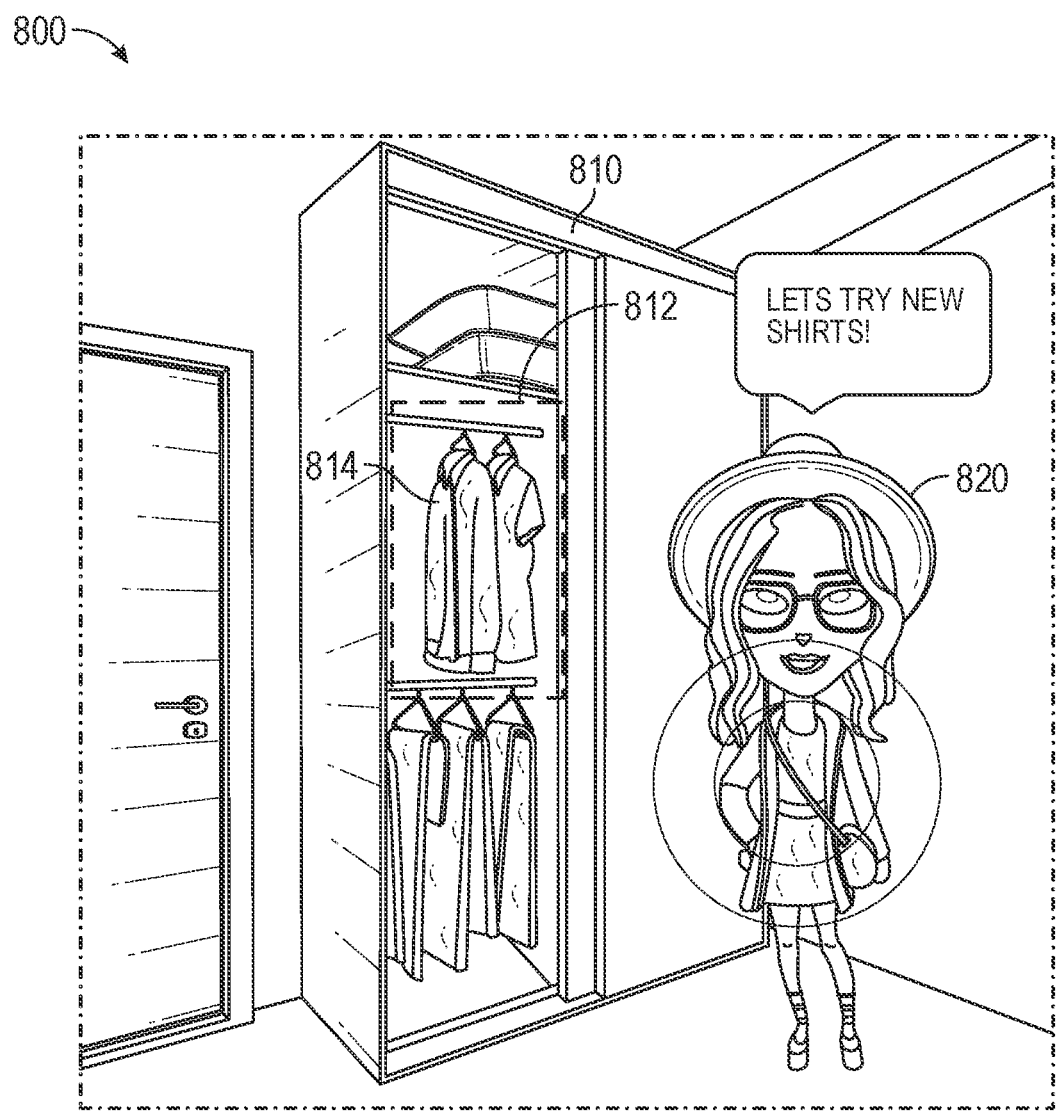

As shown in FIG. 8, the AR recommendation system 224 receives an image or video 800 that depicts a room in a home. The AR recommendation system 224 applies one or more machine learning techniques to detect and recognize one or more real-world objects that are depicted in the image or video 800. For example, the AR recommendation system 224 detects and recognizes a closet 810, among other objects.

Based on the detected and recognized objects, the AR recommendation system 224 determines that the room depicted in the image or video 800 includes a closet 810. The AR recommendation system 224 identifies different portions of the closet 810. For example, the AR recommendation system 224 determines that a first portion of the closet 810 includes various garments of a first type (e.g., pants) and that a second portion of the closet 810 includes various garments of a second type (e.g., shirts). The AR recommendation system 224 can apply one or more trained machine learning techniques to recognize the type of garments that are included in the closet 810. For example, in response to detecting that the image or video 800 includes a closet object, the AR recommendation system 224 can provide the closet 810 to a trained machine learning technique to segment out and recognize the garment types that are included in the closet 810.

After receiving or determining the garment types included in the closet 810, the AR recommendation system 224 selects a first portion 812 of the closet 810. The AR recommendation system 224 displays a prompt informing the user that a virtual try-on augmented reality experience is available for the selected first portion 812. In an example, the AR recommendation system 224 displays an indicator around the first portion 812 to highlight the first portion 812. In response to receiving a user selection of the indicator, the AR recommendation system 224 activates a virtual try-on experience. In the virtual try-on experience a 3D virtual shopping assistant 820 is displayed by the AR recommendation system 224. Specifically, the AR recommendation system 224 retrieves an AR representation of a 3D virtual shopping assistant 820 and positions the 3D virtual shopping assistant 820 next to (adjacent to) the closet 810 that is depicted in the image or video 800.

The 3D virtual shopping assistant 820 can search for and select various garments of the type corresponding to the garment type of the selected portion of the closet 810. For example, if the selected first portion 812 corresponds to a shirt garment type, the 3D virtual shopping assistant 820 searches for various shirts that have a fit matching a fit of the user specified in a user profile. The 3D virtual shopping assistant 820 displays one or more AR elements representing the various garments of the garment type (e.g., AR elements representing different shirts). The 3D virtual shopping assistant 820 can receive a user input that selects a given one of the displayed AR elements. In response, the 3D virtual shopping assistant 820 activates a front facing camera of the client device 102. The 3D virtual shopping assistant 820 waits for a torso of the user to be depicted in an image captured by the client device 102 and in response, the 3D virtual shopping assistant 820 displays a shirt AR element corresponding to the selected one of the displayed AR element. The shirt AR element is displayed on top of the torso of the user allowing the user to visualize how the real-world garment will look on the user, such as in a virtual try-on experience. The user can communicate with the 3D virtual shopping assistant 820 (e.g., verbally or by selecting on-screen options) to purchase the selected AR garment or to try on a different garment. In some cases, the user can select a different portion of the closet 810. In response, the garment type of the selected portion is determined and used to search for and recommend AR garments of the same garment type.

Figure 9:
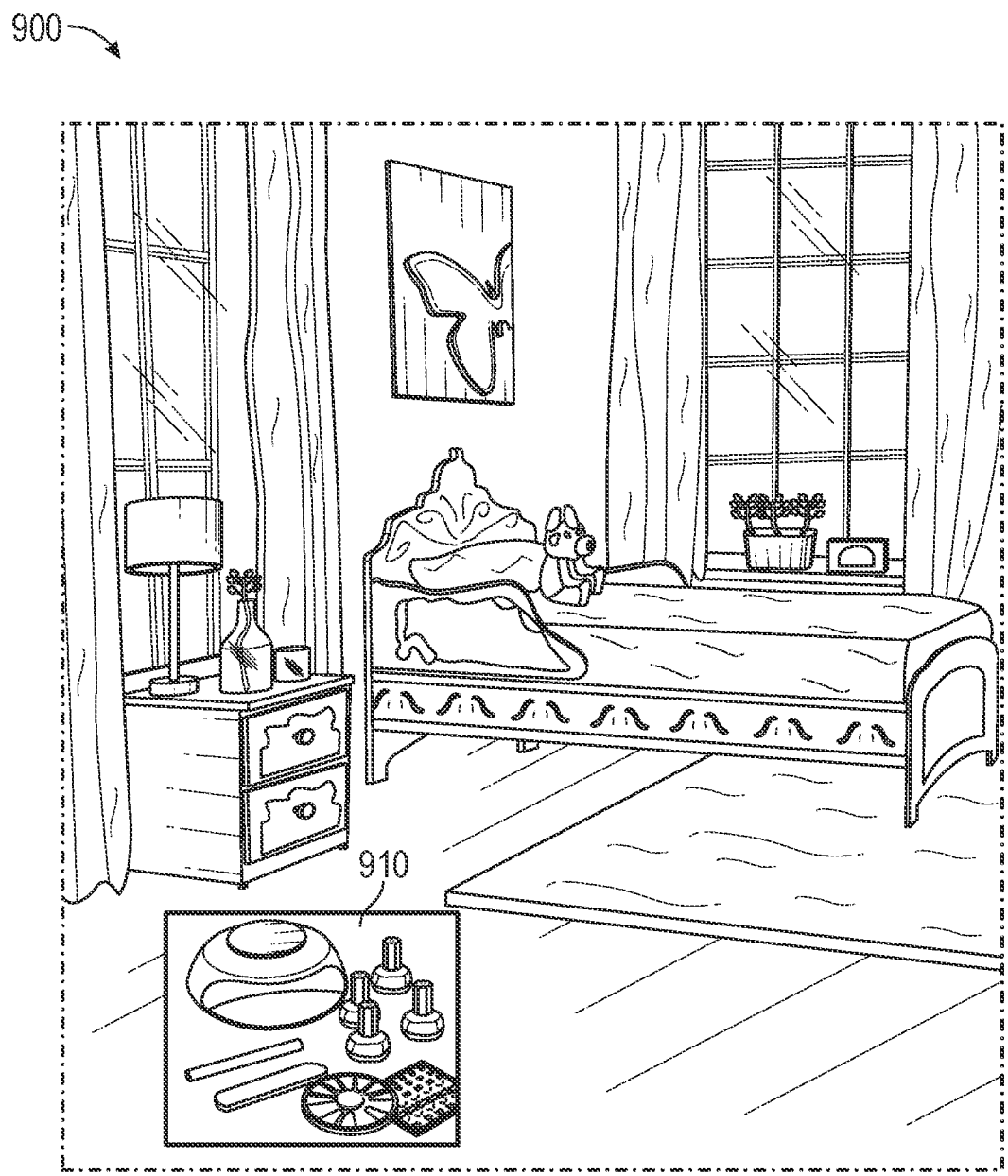

As shown in FIG. 9, the AR recommendation system 224 receives an image or video 900 that depicts a room in a home. The AR recommendation system 224 applies one or more machine learning techniques to detect and recognize one or more real-world objects that are depicted in the image or video 900. For example, the AR recommendation system 224 detects and recognizes a bed and nightstand, among other objects.

Based on the detected and recognized objects, the AR recommendation system 224 determines that the room depicted in the image or video 900 corresponds to a bedroom room classification. In response, the AR recommendation system 224 obtains a list of expected objects associated with the bedroom room classification. For example, the AR recommendation system 224 determines an age range for the bedroom depicted in the image and can identify a list of toys corresponding to the determined age range. In such cases, the AR recommendation system 224 obtains an AR element or representation 910 of the list of toys corresponding to the age range of the bedroom depicted in the image or video 900. The AR recommendation system 224 displays the AR element or representation 910 of the toys on the floor, such as next to another real-world object depicted in the image or video 900. The AR recommendation system 224 can receive a user selection of the AR element or representation 910 and in response the AR recommendation system 224 can complete a purchase transaction to obtain the toy corresponding to the AR element or representation 910.

As another example, the AR recommendation system 224 receives an image or video that depicts a room in a home. The AR recommendation system 224 applies one or more machine learning techniques to detect and recognize one or more real-world objects that are depicted in the image or video. For example, the AR recommendation system 224 detects and recognizes a vanity and shower, among other objects.

Based on the detected and recognized objects, the AR recommendation system 224 determines that the room depicted in the image or video corresponds to a bathroom room classification. In response, the AR recommendation system 224 obtains a list of expected objects associated with the bathroom room classification. For example, the AR recommendation system 224 identifies products within the bathroom and identifies a list of other bathroom products (e.g., soaps and perfumes) that may be of interest to the user. In such cases, the AR recommendation system 224 obtains an AR element or representation of the list of other bathroom products. The AR recommendation system 224 displays the AR element or representation of the other bathroom products on the vanity next to related products, such as next to another real-world object depicted in the image or video. The AR recommendation system 224 can receive a user selection of the AR element or representation and in response the AR recommendation system 224 can complete a purchase transaction to obtain the product corresponding to the AR element or representation.

Figure 10:
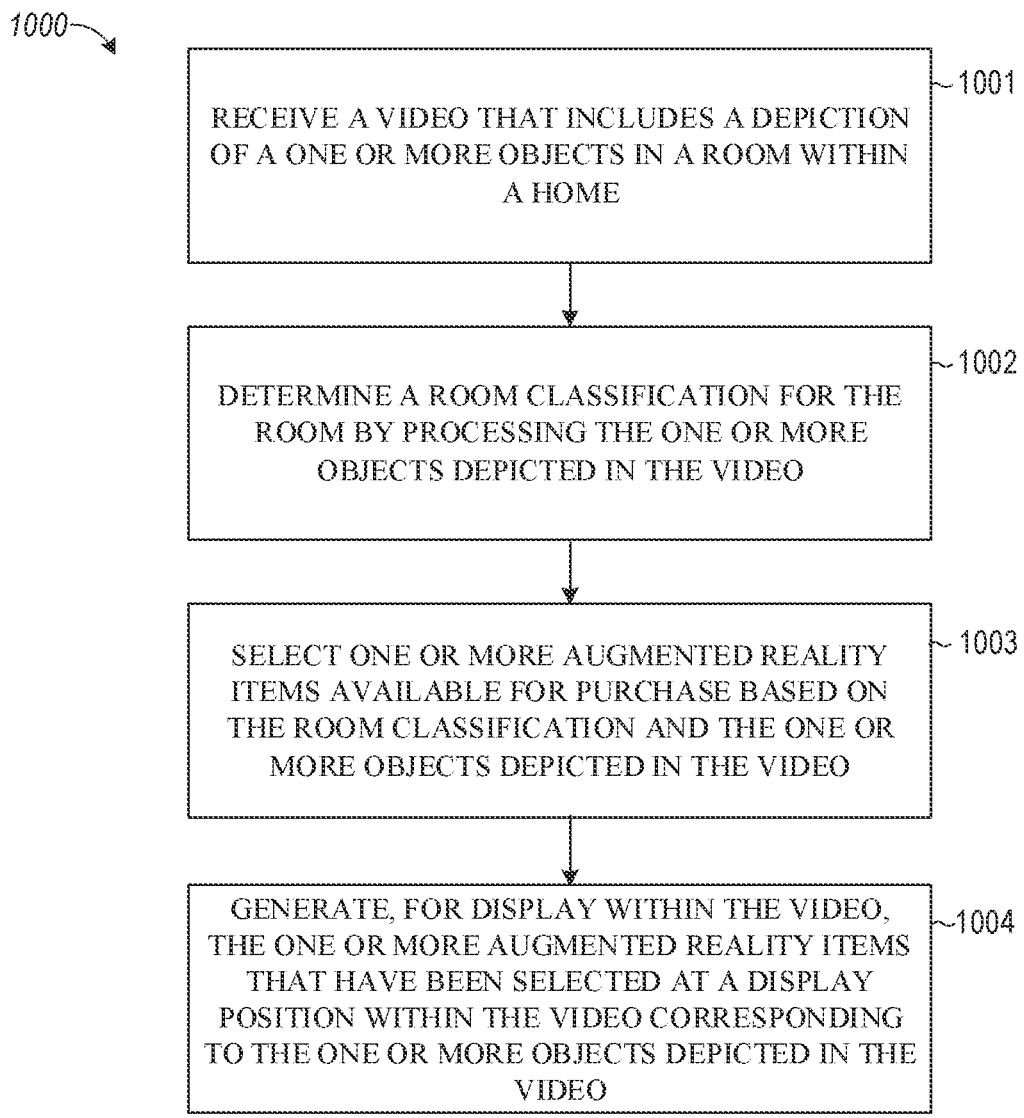
FIG. 10 is a flowchart illustrating example operations of the messaging application server, according to examples.

FIG. 10 is a flowchart of a process 1000, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, a client device 102 receives a video that includes a depiction of a one or more objects in a room within a home, as discussed above.

At operation 1002, the client device 102 determines a room classification for the room by processing the one or more objects depicted in the video, as discussed above.

At operation 1003, the client device 102 selects one or more augmented reality items available for purchase based on the room classification and the one or more objects depicted in the video, as discussed above.

At operation 1004, the client device 102 generates, for display within the video, the one or more augmented reality items that have been selected at a display position within the video corresponding to the one or more objects depicted in the video, as discussed above.

Machine Architecture

Figure 11:
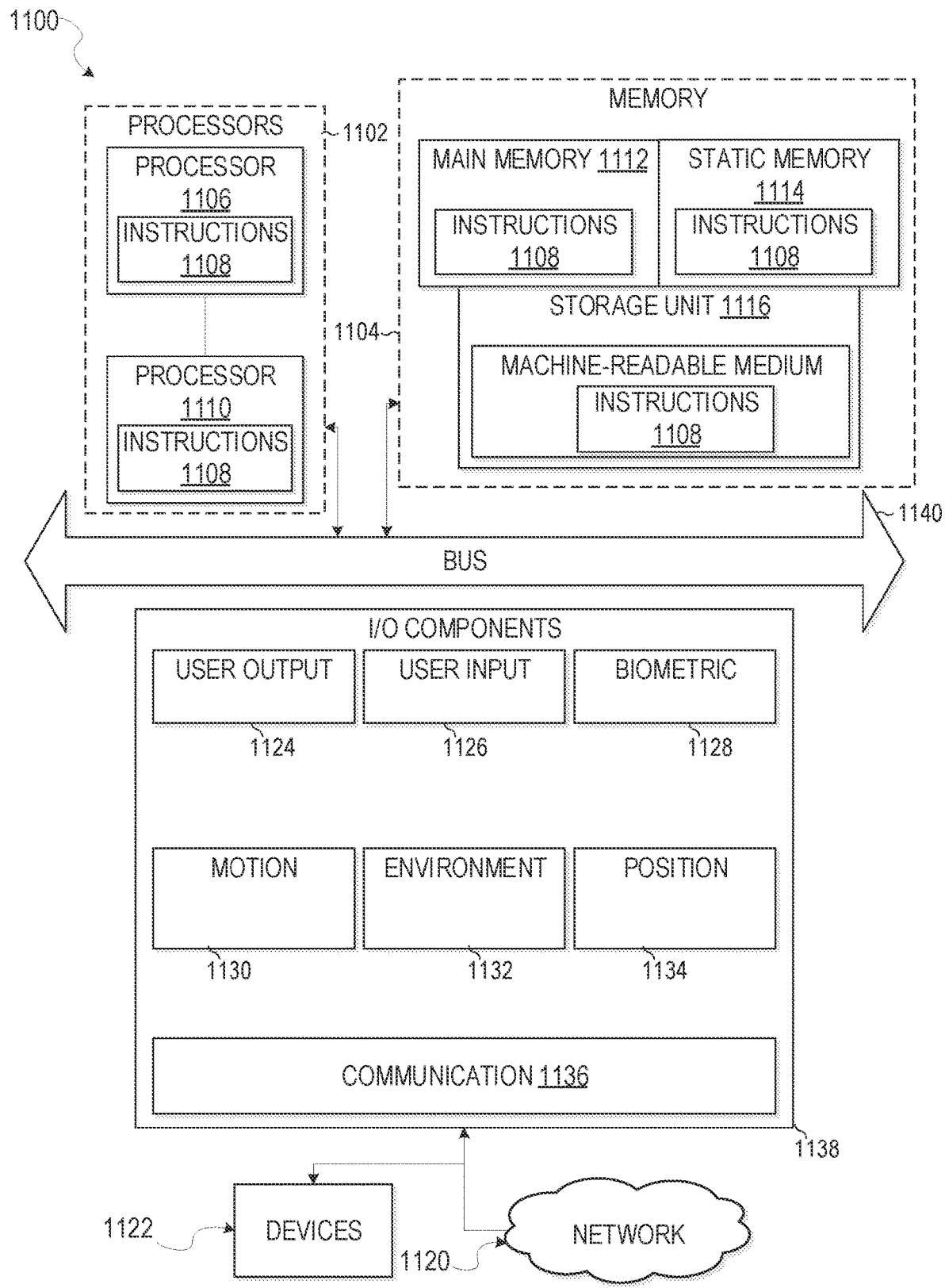
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within a machine-readable medium within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 108 may be transmitted or received using a transmission medium via a coupling (e.g., a peer-to-peer coupling) to the devices 1122.

Software Architecture

Figure 12:
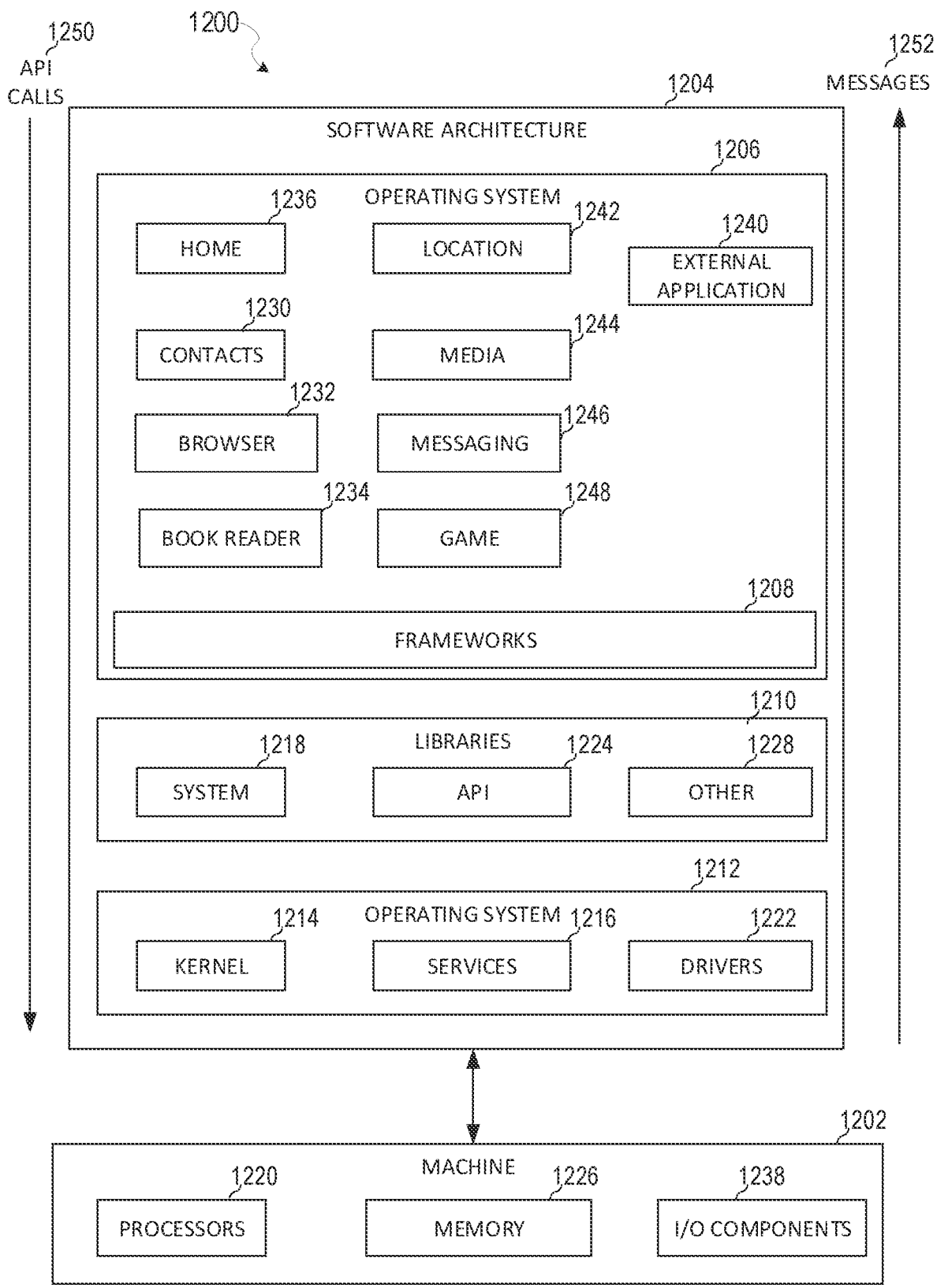
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206.

Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as an external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   receiving, by one or more processors of a user device, a video that includes a depiction of one or more objects in a room within a home;
   processing by a machine learning model the video to determine a room classification for the room by processing the one or more objects depicted in the video, the machine learning model trained based on training data to establish a relationship between a plurality of training images and ground truth room classifications for each of the training images, the machine learning model providing an output that includes an estimated age of a person associated with the room, the machine learning model comprising a neural network and is trained by performed training operations comprising:
      receiving the training data comprising the plurality of training images and the ground truth room classifications, each of the plurality of training images depicting a different room in a home;
      extracting one or more features from a first training image of the plurality of training images corresponding to real-word objects;
      applying the neural network to the extracted one or more features of the first training image of the plurality of training images to estimate an individual room classification of an individual room depicted in the first training image;
      computing a deviation between the estimated room classification and the ground truth room classification associated with the first training image;
      updating parameters of the neural network based on the computed deviation;
   determining that the room classification of the room corresponds to a bedroom; and
      repeating the training operations for each of the plurality of training images;
   determining an age range associated with the bedroom based on the one or more objects depicted in the video based on the estimated age of the person included in the output of the machine learning model;
   selecting, by the one or more processors of the user device, one or more augmented reality items available for purchase based on the room classification and the one or more objects depicted in the video, the selecting of the one or more augmented reality items comprising searching for one or more toys associated with the age range;
   generating, for display within the video on a display of the user device, the one or more augmented reality items that have been selected at a display position within the video corresponding to the one or more objects depicted in the video; and
   replacing, in the display of the user device and by the one or more processors of the user device, a depiction of an individual real-world object in the video with an individual augmented reality item of the selected one or more augmented reality items, the replacing comprising:
      identifying, by the one or more processors, a display position of the individual real-world object;
      calculating characteristic points for a set of elements of the individual real-world object to generate a mesh based on the calculated characteristic points;
      generating one or more areas on the mesh of the individual real-world object;
      aligning the one or more areas of the individual real-world object with one or more elements of a first augmented reality representation of a given one of the one or more toys with a position;
      modifying one or more visual properties of the one or more areas to cause the user device to display the first augmented reality representation within the video at an individual display position relative to the display position of the individual real-world object that has been identified by the one or more processors;
      receiving input associated with the first augmented reality representation; and
      completing a purchase transaction of the given one of the one or more toys in response to receiving the input.

2. The method of claim 1, further comprising:
   obtaining a plurality of expected objects associated with the room classification;
   detecting the one or more objects depicted in the video using an object recognition process; and
   comparing the detected one or more objects depicted in the video to the plurality of expected objects.

3. The method of claim 2, further comprising:
   based on the comparing, identifying a given expected object from the plurality of expected objects that is excluded from the detected one or more objects; and
   searching for an augmented reality item corresponding to the given expected object to be selected as the one or more augmented reality items available for purchase.

4. The method of claim 1, further comprising:
   determining a type of bedroom from a plurality of bedroom types based on the estimated age of the person included in the output of the machine learning model.

5. The method of claim 1, wherein the room classification corresponds to a living room, further comprising:
   detecting a television as a first of the one or more objects depicted in the video;
   searching for a video item available for consumption on the television; and causing a first augmented reality representation of the video item to be displayed next to or on top of the television in the video.

6. The method of claim 5, further comprising:
generating a three-dimensional (3D) mesh representation of the living room;
obtaining a plurality of furniture items corresponding to a living room classification;
detecting that a given one of the plurality of furniture items is missing from the detected one or more objects depicted in the video;
determining, based on the 3D mesh representation of the living room, that space is available for the given one of the plurality of furniture items; and
causing a second augmented reality representation of the given one of the plurality of furniture items to be displayed at a position corresponding to the space that is available together with the first augmented reality item.

7. The method of claim 6, further comprising:
receiving input that selects the second augmented reality representation; and
performing a purchase transaction to complete a purchase for the given one of the plurality of furniture items.

8. The method of claim 1, further comprising:
determining that the individual real-world object depicted in the video is a first type of object;
processing a three-dimensional (3D) mesh representation of the room to compute an amount of available physical space in the room and how much of space the individual real-world object consumes;
determining that a different object corresponding to the first type of object has physical dimensions that are different from physical dimensions of the individual real-world object and that satisfy one or more fit parameters of the 3D mesh representation; and
in response to determining that the different object corresponding to the first type of object has physical dimensions satisfy the one or more fit parameters of the 3D mesh representation, selecting the individual augmented reality item corresponding to the different object to replace the depiction of the individual real-world object in the video.

9. The method of claim 1, wherein the room classification corresponds to a bedroom or an office, further comprising:
generating a three-dimensional (3D) mesh representation of the bedroom or the office;
obtaining a plurality of furniture items corresponding to a bedroom or office classification;
detecting that a given one of the plurality of furniture items is missing from one or more objects depicted in the video;
determining, based on the 3D mesh representation of the bedroom or the office, that space is available for the given one of the plurality of furniture items; and
causing a first augmented reality representation of the given one of the plurality of furniture items to be displayed at a position corresponding to the space that is available.

10. The method of claim 1, wherein the room classification corresponds to a bedroom, further comprising:
detecting that a closet is included among the one or more objects depicted in the video; and
causing a visual indicator to be presented over the closet depicted in the video in response to detecting that the closet is included among the one or more objects depicted in the video.

11. The method of claim 10, further comprising:
causing an option to access a virtual clothing try-on augmented reality experience in response to detecting that the closet is included among the one or more objects depicted in the video;
receiving input that selects a given augmented reality item of a displayed set of the one or more augmented reality items;
in response to receiving the input, activating a front-facing camera of a user device;
waiting for a torso of a person to be depicted in an image captured by the front-facing camera of the user device;
in response to detecting the torso of the person in one or more images captured by the front-facing camera of the user device, displaying a shirt augmented reality element corresponding to the selected given augmented reality item on top of the torso of the person in the one or more images.

12. The method of claim 10, further comprising:
generating, for display within the video, a three-dimensional (3D) virtual shopping assistant adjacent to the closet that is detected in the video;
detecting that a portion of the closet includes a particular garment type;
causing the portion to be highlighted by the visual indicator; and
causing the 3D virtual shopping assistant to recommend for purchase clothing corresponding to the particular garment type.

13. The method of claim 1, wherein the room classification corresponds to an office, further comprising:
detecting a computer monitor as a first of the one or more objects depicted in the video;
searching for a video game item available for consumption on the computer monitor; and
causing a first augmented reality representation of the video game item to be displayed next to or on top of the computer monitor in the video.

14. The method of claim 1, wherein the room classification corresponds to a bedroom or an office, further comprising:
generating a three-dimensional (3D) mesh representation of the bedroom or the office;
detecting that a given one of detected one or more objects depicted in the video includes a given furniture item that fails to satisfy one or more fit parameters of the 3D mesh representation;
identifying, based on the 3D mesh representation of the bedroom or the office, a recommended furniture item that satisfies the one or more fit parameters of the 3D mesh representation and is of a same type as the given furniture item included in the video; and
causing a first augmented reality representation of the recommended furniture item to be displayed at a position corresponding to space that is available.

15. The method of claim 1, wherein the room classification corresponds to a kitchen, further comprising:
detecting a sink and stove as first and second of the one or more objects depicted in the video;
searching for a kitchen appliance that is excluded from the one or more objects depicted in the video; and
causing a first augmented reality representation of the kitchen appliance to be displayed within the video, the first augmented reality representation enabling purchase of the kitchen appliance.

16. The method of claim 15, further comprising:
    detecting a refrigerator as a third of the one or more objects depicted in the video;
    searching for a recipe; and
    causing a second augmented reality representation of the recipe to be displayed within the video next to or on top of the refrigerator.
17. The method of claim 1, wherein the room classification is determined by determining relative positions of the one or more objects to determine the room classification.
18. The method of claim 1, further comprising:
    receiving a set of recognized objects that are in the room;
    comparing the set of recognized objects to a first list of expected objects associated with a first room classification;
    computing a first percentage of the set of recognized objects that are in the first list of expected objects to generate a first relevancy score;
    comparing the set of recognized objects to a second list of expected objects associated with a second room classification;
    computing a second percentage of the set of recognized objects that are in the second list of expected objects to generate a second relevancy score;
    determining that the second relevancy score is greater than the first relevancy score; and
    assigning the second room classification to the room depicted in the video in response to determining that the second relevancy score is greater than the first relevancy score.
19. A system comprising:
    at least one processor configured to perform operations comprising:
    receiving a video that includes a depiction of one or more objects in a room within a home;
    processing by a machine learning model the video to determine a room classification for the room by processing the one or more objects depicted in the video, the machine learning model trained based on training data to establish a relationship between a plurality of training images and ground truth room classifications for each of the training images, the machine learning model providing an output that includes an estimated age of a person associated with the room, the machine learning model comprising a neural network and is trained by performed training operations comprising:
        receiving the training data comprising the plurality of training images and the ground truth room classifications, each of the plurality of training images depicting a different room in a home;
        extracting one or more features from a first training image of the plurality of training images corresponding to real-word objects;
        applying the neural network to the extracted one or more features of the first training image of the plurality of training images to estimate an individual room classification of an individual room depicted in the first training image;
        computing a deviation between the estimated room classification and the ground truth room classification associated with the first training image;
        updating parameters of the neural network based on the computed deviation;
        determining that the room classification of the room corresponds to a bedroom; and
        repeating the training operations for each of the plurality of training images;
    determining an age range associated with the bedroom based on the one or more objects depicted in the video based on the estimated age of the person included in the output of the machine learning model;
    selecting one or more augmented reality items available for purchase based on the room classification and the one or more objects depicted in the video, the selecting of the one or more augmented reality items comprising searching for one or more toys associated with the age range;
    generating, for display within the video, the one or more augmented reality items that have been selected at a display position within the video corresponding to the one or more objects depicted in the video; and
    replacing, in a display of a user device and by the at least one processor of the user device, a depiction of an individual real-world object in the video with an individual augmented reality item of the selected one or more augmented reality items, the replacing comprising:
        identifying, by the at least one processor, a display position of the individual real-world object;
        calculating characteristic points for a set of elements of the individual real-world object to generate a mesh based on the calculated characteristic points;
        generating one or more areas on the mesh of the individual real-world object;
        aligning the one or more areas of the individual real-world object with one or more elements of a first augmented reality representation of a given one of the one or more toys with a position;
        modifying one or more visual properties of the one or more areas to cause the user device to display the first augmented reality representation within the video at an individual display position relative to the display position of the individual real-world object that has been identified by the at least one processor;
        receiving input associated with the first augmented reality representation; and
        completing a purchase transaction of the given one of the one or more toys in response to receiving the input.
20. A non-transitory machine-readable storage medium that includes instructions that, when executed by one or more processors of a machine, cause the machine to perform operations comprising:
    receiving a video that includes a depiction of one or more objects in a room within a home;
    processing by a machine learning model the video to determine a room classification for the room by processing the one or more objects depicted in the video, the machine learning model trained based on training data to establish a relationship between a plurality of training images and ground truth room classifications for each of the training images, the machine learning model providing an output that includes an estimated age of a person associated with the room, the machine learning model comprising a neural network and is trained by performed training operations comprising:
        receiving the training data comprising the plurality of training images and the ground truth room classifications, each of the plurality of training images depicting a different room in a home;
        extracting one or more features from a first training image of the plurality of training images corresponding to real-word objects;

applying the neural network to the extracted one or more features of the first training image of the plurality of training images to estimate an individual room classification of an individual room depicted in the first training image;
computing a deviation between the estimated room classification and the ground truth room classification associated with the first training image;
updating parameters of the neural network based on the computed deviation;
determining that the room classification of the room corresponds to a bedroom; and
repeating the training operations for each of the plurality of training images;
determining an age range associated with the bedroom based on the one or more objects depicted in the video based on the estimated age of the person included in the output of the machine learning model;
selecting one or more augmented reality items available for purchase based on the room classification and the one or more objects depicted in the video, the selecting of the one or more augmented reality items comprising searching for one or more toys associated with the age range;
generating, for display within the video, the one or more augmented reality items that have been selected at a display position within the video corresponding to the one or more objects depicted in the video; and
replacing, in a display of a user device and by the one or more processors of the user device, a depiction of an individual real-world object in the video with an individual augmented reality item of the selected one or more augmented reality items, the replacing comprising:
identifying, by the one or more processors, a display position of the individual real-world object;
calculating characteristic points for a set of elements of the individual real-world object to generate a mesh based on the calculated characteristic points;
generating one or more areas on the mesh of the individual real-world object;
aligning the one or more areas of the individual real-world object with one or more elements of a first augmented reality representation of a given one of the one or more toys with a position;
modifying one or more visual properties of the one or more areas to cause the user device to display the first augmented reality representation within the video at an individual display position relative to the display position of the individual real-world object that has been identified by the one or more processors;
receiving input associated with the first augmented reality representation; and
completing a purchase transaction of the given one of the one or more toys in response to receiving the input.

* * * * *